US012565274B2

(12) United States Patent
Gilmore et al.

(10) Patent No.: US 12,565,274 B2
(45) Date of Patent: Mar. 3, 2026

(54) BICYCLE SEAT WITH VIBRATION ISOLATION

(71) Applicant: Toyota Motor Engineering & Manufacturing North America, Inc., Plano, TX (US)

(72) Inventors: Paul A. Gilmore, Ann Arbor, MI (US); Michael Paul Rowe, Pinckney, MI (US); Umesh N. Gandhi, Farmington Hills, MI (US); Sanay S. Tandon, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 462 days.

(21) Appl. No.: 18/084,195

(22) Filed: Dec. 19, 2022

(65) Prior Publication Data

US 2024/0199158 A1 Jun. 20, 2024

(51) Int. Cl.
| | |
|---|---|
| *F16F 1/32* | (2006.01) |
| *B62J 1/04* | (2006.01) |
| *B62J 1/06* | (2006.01) |

(52) U.S. Cl.
CPC ................ B62J 1/065 (2013.01); B62J 1/04 (2013.01); F16F 1/32 (2013.01); *B62K 2201/02* (2013.01)

(58) Field of Classification Search
CPC ...... B62J 1/02; B62J 1/06; B62J 1/065; F16F 1/32; F16F 1/322

(Continued)

(56) References Cited

U.S. PATENT DOCUMENTS

| | | | |
|---|---|---|---|
| 82,276 | A | 9/1868 | Belleville |
| 626,602 | A | 6/1899 | Fenton |

(Continued)

FOREIGN PATENT DOCUMENTS

| | | | | |
|---|---|---|---|---|
| CN | 2548884 | Y | 5/2003 | |
| CN | 1460081 | A * | 12/2003 | ................ B62J 1/04 |

(Continued)

OTHER PUBLICATIONS

CN-140061-A (Year: 2003).*

(Continued)

*Primary Examiner* — Thomas J Williams
(74) *Attorney, Agent, or Firm* — Christopher G. Darrow; Darrow Mustafa PC

(57) ABSTRACT

A bicycle seat suspension can include one or more movable body members. The one or more movable body members can be configured to be operatively connected to a bicycle saddle. The one or more movable body members can be configured to change configuration when a load is applied to the bicycle saddle. The bicycle seat suspension can also include a vibration isolator. The vibration isolator can be configured to exhibit a non-linear stiffness profile including a region of quasi-zero stiffness. The vibration isolator can be operatively positioned such that, when the one or more movable body members change configuration responsive to a load being applied to the bicycle saddle, the one or more movable body members can engage the vibration isolator. As a result, the vibration isolator can isolate a person seated on the bicycle saddle from vibrations transferred through the bicycle saddle.

16 Claims, 11 Drawing Sheets

(58) Field of Classification Search
USPC ........ 267/158, 159, 161, 162, 131, 132, 133
See application file for complete search history.

(56) References Cited

U.S. PATENT DOCUMENTS

| | | | |
|---|---|---|---|
| 640,756 A | 1/1900 | Douglas | |
| 714,121 A | 11/1902 | Williams | |
| 771,841 A | 10/1904 | Sills | |
| 1,468,835 A | 9/1923 | Rosen | |
| 1,826,597 A | 10/1931 | Brecht | |
| 2,121,835 A | 6/1938 | Sproul | |
| 2,162,719 A * | 6/1939 | Hay | F16F 1/32 |
| | | | 267/3 |
| 2,263,107 A * | 11/1941 | Smirl | B60G 11/00 |
| | | | 280/124.164 |
| 2,325,561 A | 7/1943 | Weber et al. | |
| 2,655,935 A | 10/1953 | Kinzbach | |
| 2,753,177 A | 7/1956 | Boyd | |
| 2,973,015 A | 2/1961 | Thompson | |
| 2,991,655 A | 7/1961 | Jorgensen et al. | |
| 3,010,713 A * | 11/1961 | Turkovich | B23Q 11/001 |
| | | | 248/323 |
| 3,080,160 A | 3/1963 | Orner | |
| 3,083,038 A | 3/1963 | Moulton | |
| 3,107,905 A * | 10/1963 | Lucas | F16F 1/32 |
| | | | 248/200.1 |
| 3,195,923 A | 7/1965 | Moulton | |
| 3,366,082 A | 1/1968 | Ross | |
| 3,394,631 A | 7/1968 | Thompson | |
| 3,430,942 A | 3/1969 | Toth et al. | |
| 3,559,512 A | 2/1971 | Aggarwal | |
| 3,574,347 A | 4/1971 | Hughes | |
| 3,608,883 A | 9/1971 | Russold et al. | |
| 3,743,266 A | 7/1973 | Sturman et al. | |
| 3,836,195 A | 9/1974 | Teeri | |
| 3,856,242 A | 12/1974 | Cook | |
| 3,858,665 A | 1/1975 | Winker | |
| 3,873,079 A | 3/1975 | Kuus | |
| 3,980,016 A | 9/1976 | Taylor | |
| 4,168,101 A | 9/1979 | DiGrande | |
| 4,179,135 A | 12/1979 | Slater | |
| 4,215,841 A | 8/1980 | Herring, Jr. | |
| 4,351,556 A | 9/1982 | Worringer | |
| 4,421,337 A | 12/1983 | Pratt | |
| 4,457,213 A | 7/1984 | Morgan | |
| 4,530,491 A | 7/1985 | Bucksbee et al. | |
| 4,568,067 A * | 2/1986 | Iwata | B60G 15/066 |
| | | | 267/28 |
| 4,612,429 A | 9/1986 | Milianowicz | |
| 4,779,852 A | 10/1988 | Wassell | |
| 4,799,654 A | 1/1989 | Eickmann | |
| 4,824,338 A | 4/1989 | Eickmann | |
| 4,850,643 A | 7/1989 | Rollman | |
| 4,925,203 A | 5/1990 | Buckler | |
| 4,984,777 A * | 1/1991 | Kurr | F16F 1/366 |
| | | | 267/152 |
| 5,163,697 A | 11/1992 | Kastan | |
| 5,178,357 A | 1/1993 | Platus | |
| 5,222,709 A | 6/1993 | Culley, Jr. et al. | |
| 5,248,159 A | 9/1993 | Moore | |
| 5,263,694 A | 11/1993 | Smith et al. | |
| 5,285,697 A | 2/1994 | Clausen | |
| 5,301,974 A | 4/1994 | Knapp | |
| 5,310,157 A | 5/1994 | Platus | |
| 5,314,207 A | 5/1994 | Camfield et al. | |
| 5,335,929 A | 8/1994 | Takagaki et al. | |
| 5,354,085 A | 10/1994 | Gally | |
| 5,390,903 A | 2/1995 | Fidziukiewicz | |
| 5,417,446 A | 5/1995 | Pileggi | |
| 5,441,292 A | 8/1995 | Busby | |
| 5,462,302 A | 10/1995 | Leitner | |
| 5,489,139 A | 2/1996 | McFarland | |
| 5,498,013 A | 3/1996 | Hwang | |
| 5,501,477 A | 3/1996 | Moreau | |
| 5,505,493 A | 4/1996 | Camfield et al. | |
| 5,507,476 A | 4/1996 | Lin | |
| 5,509,676 A | 4/1996 | Fukutake et al. | |
| 5,509,679 A | 4/1996 | Leitner | |
| 5,511,444 A | 4/1996 | Clausen et al. | |
| 5,570,896 A | 11/1996 | Collins | |
| 5,599,034 A | 2/1997 | Brigden | |
| 5,669,594 A | 9/1997 | Platus et al. | |
| 5,669,598 A | 9/1997 | Ticey et al. | |
| 5,678,457 A | 10/1997 | Hals | |
| 5,909,890 A | 6/1999 | Sachs et al. | |
| 5,924,714 A | 7/1999 | Farris et al. | |
| 5,954,355 A | 9/1999 | Hsu | |
| 6,007,148 A | 12/1999 | Yu | |
| 6,089,656 A | 7/2000 | Hals | |
| 6,099,010 A | 8/2000 | Busby | |
| 6,135,477 A | 10/2000 | D'Aluisio et al. | |
| 6,164,424 A | 12/2000 | Girvin et al. | |
| 6,176,476 B1 | 1/2001 | Wang | |
| 6,244,610 B1 | 6/2001 | Kramer-Massow | |
| 6,260,870 B1 | 7/2001 | Fan | |
| 6,260,918 B1 | 7/2001 | Lee | |
| 6,270,065 B1 * | 8/2001 | Hals | B62J 1/04 |
| | | | 267/132 |
| 6,354,556 B1 | 3/2002 | Ritchie et al. | |
| 6,371,463 B1 | 4/2002 | Sorovshian | |
| 6,409,130 B1 * | 6/2002 | Maret | B62J 1/065 |
| | | | 248/219.2 |
| 6,425,598 B2 | 7/2002 | Murayama | |
| 6,443,524 B1 | 9/2002 | Yu | |
| 6,530,564 B1 | 3/2003 | Julien | |
| 6,581,494 B2 | 6/2003 | Sechler | |
| 6,592,136 B2 | 7/2003 | Becker et al. | |
| 6,659,488 B1 | 12/2003 | Beresnitzky et al. | |
| 6,712,374 B2 | 3/2004 | Assier | |
| 6,886,845 B2 | 5/2005 | Chao | |
| 6,935,157 B2 | 8/2005 | Miller | |
| 6,935,693 B2 | 8/2005 | Janscha et al. | |
| 6,939,097 B2 | 9/2005 | Carr et al. | |
| RE39,159 E | 7/2006 | Klassen et al. | |
| 7,146,877 B2 | 12/2006 | You | |
| 7,152,839 B2 | 12/2006 | Mullinix et al. | |
| 7,168,726 B2 | 1/2007 | Klein | |
| 7,207,585 B2 | 4/2007 | Czysz | |
| 7,261,310 B2 | 8/2007 | Yifrah et al. | |
| 7,540,516 B2 | 6/2009 | Arnce | |
| 7,581,743 B2 | 9/2009 | Graney | |
| 7,591,475 B1 | 9/2009 | Calfee | |
| D614,538 S | 4/2010 | Rochon | |
| 7,722,070 B2 | 5/2010 | Ritchey | |
| 7,722,072 B2 | 5/2010 | Hoogendoorn | |
| 7,798,513 B1 | 9/2010 | Salvant | |
| 7,822,522 B2 | 10/2010 | Wereley et al. | |
| 7,854,425 B2 | 12/2010 | Evans | |
| 7,874,576 B2 | 1/2011 | Gandhi | |
| 8,006,993 B1 | 8/2011 | Chamberlain | |
| 8,053,068 B2 | 11/2011 | Fanucci et al. | |
| 8,166,626 B2 | 5/2012 | Sereni et al. | |
| 8,185,988 B2 | 5/2012 | Wieland | |
| 8,366,082 B2 | 2/2013 | Evans | |
| 8,439,383 B2 | 5/2013 | Talavasek | |
| 8,464,609 B2 | 6/2013 | Shiu et al. | |
| 8,500,108 B2 | 8/2013 | Rode | |
| 8,556,284 B2 | 10/2013 | Appleman | |
| 8,585,026 B2 | 11/2013 | Dittmar | |
| 8,707,825 B2 | 4/2014 | Shiu et al. | |
| 8,807,585 B2 | 8/2014 | Alan | |
| 8,888,117 B2 | 11/2014 | Barkley et al. | |
| 8,919,751 B2 | 12/2014 | Kneidel | |
| 8,925,949 B2 | 1/2015 | Zecchetto | |
| 9,156,521 B2 | 10/2015 | Lumpkin | |
| 9,194,452 B2 | 11/2015 | Hawkins et al. | |
| 9,359,036 B2 | 6/2016 | Thompson | |
| 9,394,950 B1 | 7/2016 | Henry et al. | |
| 9,408,428 B2 | 8/2016 | Gaudet | |
| 9,550,542 B2 | 1/2017 | Figueroa et al. | |
| 9,561,834 B2 | 2/2017 | Zawistowski | |
| 9,669,891 B2 | 6/2017 | Evans | |
| 9,714,065 B2 | 7/2017 | Mondello | |
| 9,764,788 B1 * | 9/2017 | Sung | F16F 3/10 |

(56) References Cited

U.S. PATENT DOCUMENTS

| | | | |
|---|---|---|---|
| 9,821,879 | B2 | 11/2017 | Hoogendoorn et al. |
| 9,926,033 | B1 | 3/2018 | Tsai |
| 9,950,760 | B2 | 4/2018 | Ahnert et al. |
| 9,957,007 | B2 | 5/2018 | Bigolin |
| 9,981,713 | B2 | 5/2018 | Tsai |
| 10,039,953 | B2 | 8/2018 | Prosnitz |
| 10,300,974 | B1 | 5/2019 | O'Reilly |
| 10,351,206 | B2 | 7/2019 | Voss |
| 10,371,229 | B2 | 8/2019 | Gandhi et al. |
| 10,532,672 | B1 | 1/2020 | Pinkelman et al. |
| 10,611,424 | B2 | 4/2020 | McFarland |
| 10,677,310 | B2 | 6/2020 | Gandhi et al. |
| 10,766,563 | B2 | 9/2020 | Hoogendoorn et al. |
| 10,822,048 | B2 | 11/2020 | Hoogendorn et al. |
| 10,850,785 | B2 | 12/2020 | O'Reilly |
| 10,926,830 | B2 | 2/2021 | Zawistowski |
| 11,040,754 | B2 | 6/2021 | Lynch |
| 11,137,045 | B2 | 10/2021 | Gandhi et al. |
| 11,173,983 | B2 | 11/2021 | Zawistowski |
| 11,242,113 | B2 | 2/2022 | Gatto et al. |
| 11,299,231 | B2 | 4/2022 | Tsutsui et al. |
| 11,312,445 | B2 | 4/2022 | Andueza et al. |
| 11,338,711 | B1 | 5/2022 | Gilmore et al. |
| 11,485,437 | B2 | 11/2022 | Gilmore et al. |
| 11,565,763 | B1 | 1/2023 | Gilmore et al. |
| 11,603,153 | B1 | 3/2023 | Trager et al. |
| 11,603,903 | B2 | 3/2023 | Gandhi et al. |
| 11,628,898 | B1 | 4/2023 | Trager et al. |
| 11,827,299 | B2 | 11/2023 | Gilmore et al. |
| 11,927,236 | B2 | 3/2024 | Gandhi et al. |
| 12,129,902 | B2 | 10/2024 | Gilmore et al. |
| 12,134,439 | B2 | 11/2024 | Barenbrug et al. |
| 12,246,792 | B2 | 3/2025 | Watanabe |
| 12,337,926 | B2 | 6/2025 | Looney |
| 2002/0084620 | A1 | 7/2002 | Yu et al. |
| 2004/0061305 | A1 | 4/2004 | Christini |
| 2004/0070165 | A1 | 4/2004 | Liebettrau et al. |
| 2004/0201199 | A1 | 10/2004 | Liebettrau et al. |
| 2004/0245830 | A1 | 12/2004 | Scheck et al. |
| 2006/0260432 | A1 | 11/2006 | Hsu |
| 2007/0138720 | A1 | 6/2007 | Evans |
| 2008/0054595 | A1 | 3/2008 | Lu |
| 2009/0025833 | A1 | 1/2009 | Schussler |
| 2009/0226691 | A1 | 9/2009 | Mankame et al. |
| 2011/0037210 | A1 | 2/2011 | Rode |
| 2011/0285106 | A1 | 11/2011 | Talavasek |
| 2012/0018577 | A1 | 1/2012 | Quiroz-Hernandez |
| 2012/0223504 | A1 | 9/2012 | Antonot |
| 2014/0015220 | A1 | 1/2014 | Talavasek |
| 2014/0110979 | A1 | 4/2014 | Barkley et al. |
| 2014/0174247 | A1 | 6/2014 | Kovalak, Jr. et al. |
| 2014/0265468 | A1 | 9/2014 | Greenhill et al. |
| 2014/0274582 | A1 | 9/2014 | Simmons |
| 2015/0115569 | A1 | 4/2015 | Matheson et al. |
| 2015/0298580 | A1 | 10/2015 | Kanai |
| 2016/0009156 | A1 | 1/2016 | Leonard et al. |
| 2016/0068085 | A1 | 3/2016 | Mindel et al. |
| 2016/0075400 | A1 | 3/2016 | Ragland et al. |
| 2016/0082870 | A1* | 3/2016 | Fujita ..................... B60N 2/522 248/561 |
| 2016/0152290 | A1 | 6/2016 | Bigolin |
| 2018/0195570 | A1 | 7/2018 | Churchill et al. |
| 2018/0195571 | A1 | 7/2018 | Churchill et al. |
| 2018/0312086 | A1 | 11/2018 | Meingast et al. |
| 2018/0339744 | A1 | 11/2018 | McFarland |
| 2019/0186587 | A1 | 6/2019 | Gandhi et al. |
| 2019/0186588 | A1 | 6/2019 | Gandhi et al. |
| 2019/0186589 | A1 | 6/2019 | Gandhi et al. |
| 2020/0238781 | A1 | 7/2020 | Hadi |
| 2020/0298732 | A1 | 9/2020 | Gandhi et al. |
| 2020/0393013 | A1* | 12/2020 | Schneider ................. F16F 3/02 |
| 2021/0009228 | A1 | 1/2021 | Yi |
| 2022/0144152 | A1 | 5/2022 | Gilmore et al. |
| 2022/0145957 | A1 | 5/2022 | Gilmore et al. |
| 2022/0145958 | A1 | 5/2022 | Gilmore et al. |
| 2022/0153370 | A1 | 5/2022 | Gilmore et al. |
| 2022/0196109 | A1 | 6/2022 | Gandhi et al. |
| 2022/0196111 | A1 | 6/2022 | Gandhi et al. |
| 2022/0299083 | A1 | 9/2022 | Gilmore et al. |
| 2022/0299084 | A1 | 9/2022 | Gilmore et al. |
| 2024/0083535 | A1 | 3/2024 | Watanabe |
| 2024/0199158 | A1* | 6/2024 | Gilmore ................... B62J 1/065 |
| 2024/0253725 | A1 | 8/2024 | Pfaeffle et al. |

FOREIGN PATENT DOCUMENTS

| | | | |
|---|---|---|---|
| CN | 202811955 | U | 3/2013 |
| CN | 103899704 | B | 11/2015 |
| CN | 112061292 | A | 12/2020 |
| CN | 114033062 | A | 2/2022 |
| CN | 217575496 | U | 10/2022 |
| DE | 4232655 | C2 * | 11/1997 ............... B62J 1/02 |
| JP | 2006027497 | A | 2/2006 |
| JP | 2011201378 | A | 10/2011 |
| KR | 102106610 | B1 | 5/2020 |
| TW | M612680 | U | 6/2021 |
| WO | 2009027681 | A1 | 3/2009 |

OTHER PUBLICATIONS

Gilmore et al., U.S. Appl. No. 17/571,969, filed Jan. 10, 2022.
Trager et al., U.S. Appl. No. 17/571,951, filed Jan. 10, 2022.
Trager et al., U.S. Appl. No. 17/571,940, filed Jan. 10, 2022.
International Search Report and Written Opinion for International Application No. PCT/US2023/083964, mailed on Apr. 9, 2024 (10 pages).
Carrella et al., "Demonstrator to show the effects of negative stiffness on the natural frequency of a simple oscillator", MES (2008) Proceedings of the Institution of Mechanical Engineers, Part C: Journal of Mechanical Engineering Science, vol. 222 (7), pp. 1189-1192 (4 pages).
Le, Thanh Dahn et al., "Experimental investigation of a vibration isolation system using negative stiffness structure", International Journal of Mechanical Sciences (2013) International Journal of Mechanical Sciences 170 (2013) pp. 99-112 (14 pages).
Lee, Thanh Danh et al., "A vibration isolation system in low frequency excitation region using negative stiffness structure for vehicle seat", Journal of Sound and Vibration 330 ( 2011) pp. 6311-6335 (25 pages).
Lee, C.M. et al., "A muiti-stage high-speed railroad vibration isolation system with "negative" stiffness", Joumal of Sound and Vibration 331 (2012) pp. 914-921 (8 pages).
Lee, et al., "Position control of seat suspension with minimum stiffness," Journal of Sound and Vibration 292 (2006) pp. 435-442 (8 pages).
Panagiotopoulos et al., "Advanced ultra-light multifunctional metallic-glass wave springs", Materials and Design, 2020 (10 pages).
Spaggiari et al., "Multiphysics Modelling and Design of Shape Memory Alloy Wave Springs as Linear Actuators", Proceedings of the ASME 2010 Conference on Smart Materials, Adaptive Structures and Intelligent Systems, Sep. 28-Oct. 1, 2010, Philadelphia, PA (9 pages).
Li et al., "A highly adjustable magnetorheological elastomer base isolator for real-time adaptive control", Smart Materials and Structures, Aug. 2013 (25 pages).
"Belleville Springs." Encyclopedia of Vibration, 2001.
Gilmore et al., U.S. Appl. No. 18/084,195, filed Dec. 19, 2022.
Rowe et al., U.S. Appl. No. 18/094,111, filed Jan. 6, 2023.

* cited by examiner 210, 310

400

402

260, 360

FIG. 9
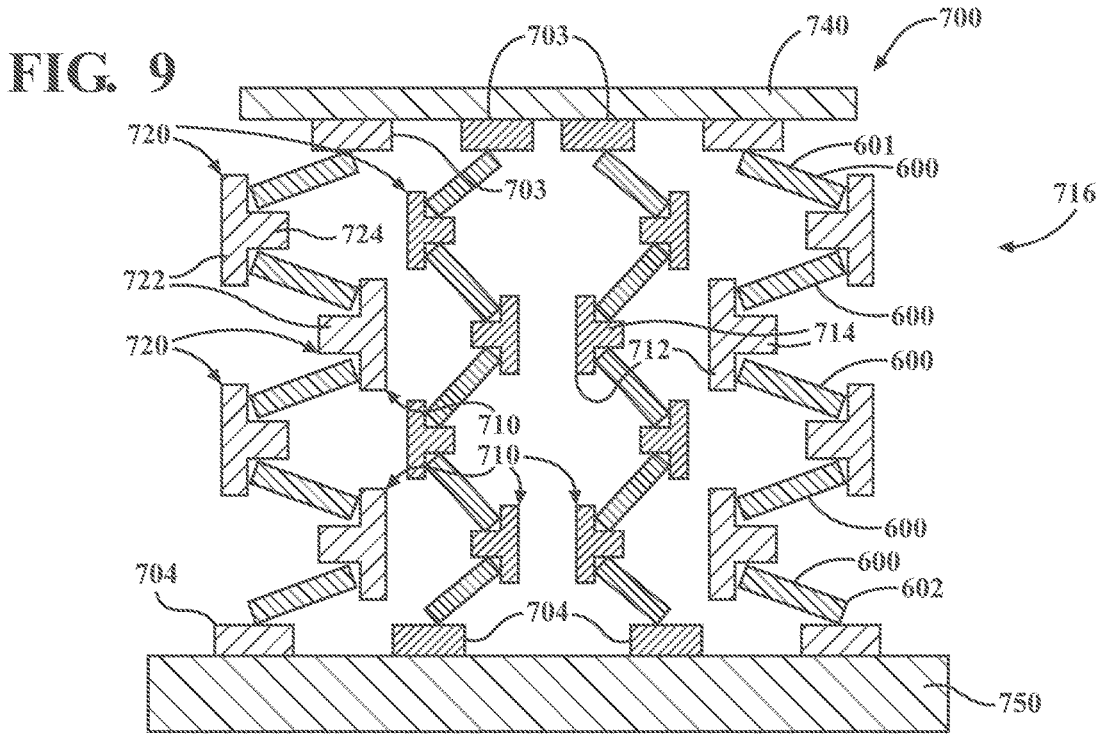
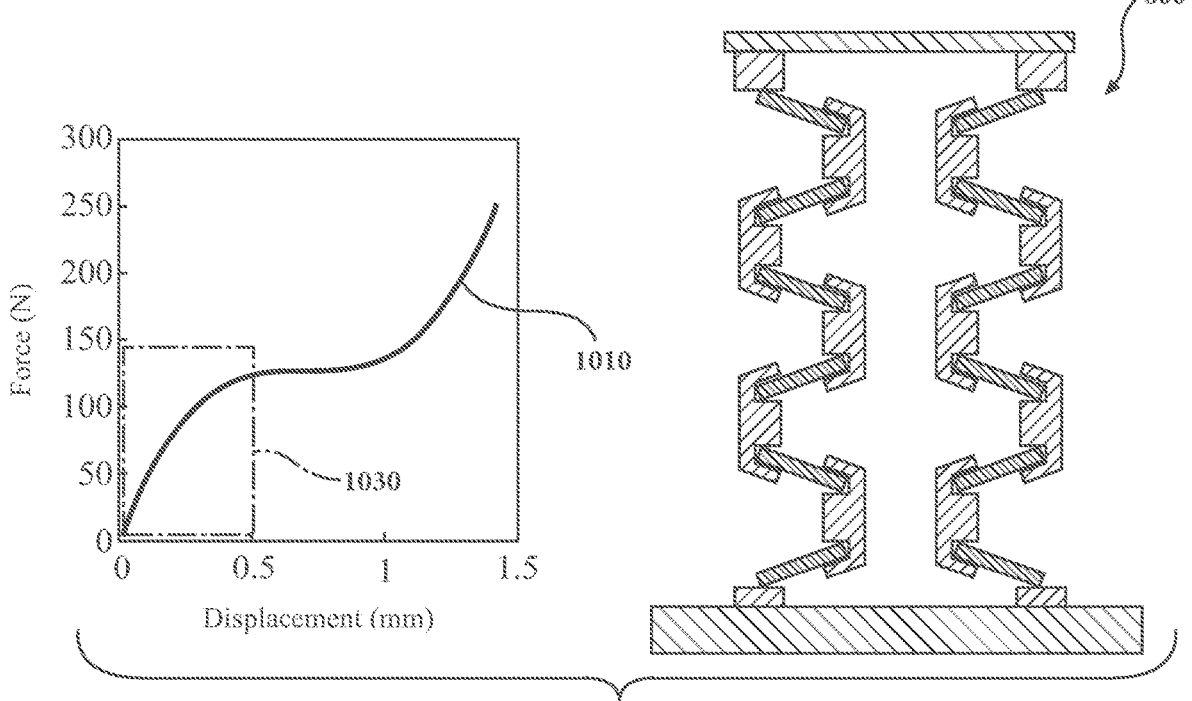
FIG. 10A

BICYCLE SEAT WITH VIBRATION ISOLATION

TECHNICAL FIELD

The subject matter described herein relates, in general, to bicycles and, more specifically, to vibration isolation for a bicycle seat.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

When riding a bicycle, a rider can drive the bicycle over rough surfaces. As a result, vibrations can be transmitted to the rider through the seat of the bicycle. These vibrations can cause rider discomfort and reduce ride quality.

SUMMARY

This section generally summarizes the disclosure and is not a comprehensive explanation of its full scope or all its features.

In one embodiment, a bicycle seat suspension is disclosed. The bicycle seat suspension can include one or more movable body members. The one or more movable body members can be configured to be operatively connected to a bicycle saddle. The one or more movable body members can also be configured to change configuration when a load is applied to the bicycle saddle. The bicycle seat suspension can also include a vibration isolator. The vibration isolator can be configured to exhibit a non-linear stiffness profile including a region of quasi-zero stiffness. The vibration isolator can be operatively positioned such that, when the one or more movable body members change configuration responsive to a load being applied to the bicycle saddle, the one or more movable body members can engage the vibration isolator, whereby the vibration isolator can isolate a person seated on the bicycle saddle from vibrations transferred through the bicycle saddle.

In another embodiment, a bicycle seat is disclosed. The bicycle seat can include a saddle. The bicycle seat can also include one or more movable body members. The one or more movable body members can be configured to be operatively connected to the saddle. The one or more movable body members can also be configured to change configuration when a load is applied to the bicycle saddle. The bicycle seat can also include a vibration isolator. The vibration isolator can include a plurality of conical springs. The vibration isolator can be configured to exhibit a non-linear stiffness profile including a region of quasi-zero stiffness. The vibration isolator can also be operatively positioned such that, when the one or more movable body members change configuration responsive to a load being applied to the bicycle saddle, the one or more movable body members can engage the vibration isolator, whereby the vibration isolator can isolate a person seated on the bicycle saddle from vibrations transferred through the bicycle saddle.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element can be designed as multiple elements or multiple elements can be designed as one element. In some embodiments, an element shown as an internal component of another element can be implemented as an external component and vice versa. Furthermore, elements may not be drawn to scale.

FIG. 9 is a cross-sectional view of an example of a second vibration isolator located within a first vibration isolator.

FIG. 10A-10C show the configuration of the isolator shown in FIG. 8 at various regions of the force-deflection curve.

DETAILED DESCRIPTION

Standard bicycles can include springs, oil pistons, air dampers, elastomers, etc. in various elements of the bicycle to mitigate vibrations transferred to the rider during use.

However, these devices only mitigate vibrations and do not actually isolate the rider from the vibrations. According to arrangements described herein, a bicycle seat suspension can have one or more vibration isolators for isolating a rider of the bicycle from vibrations transferred through the bicycle. The bicycle seat suspension can include one or more body members. The body members can be movable. The one or more body members can be configured to be operatively connected to a saddle or seat of the bicycle. The one or more body members can be configured to change configuration when a load is applied to the saddle, such as when a rider sits on the saddle. The bicycle seat suspension can also include a vibration isolator configured to exhibit a non-linear stiffness profile including a region of quasi-zero stiffness. The vibration isolator can be operatively positioned such that, when the one or more body members change configuration, the one or more body members can engage the vibration isolator. When the vibration isolator is engaged, the vibration isolator can isolate a person seated on the bicycle saddle from vibrations transferred through the bicycle saddle.

Figure 1:
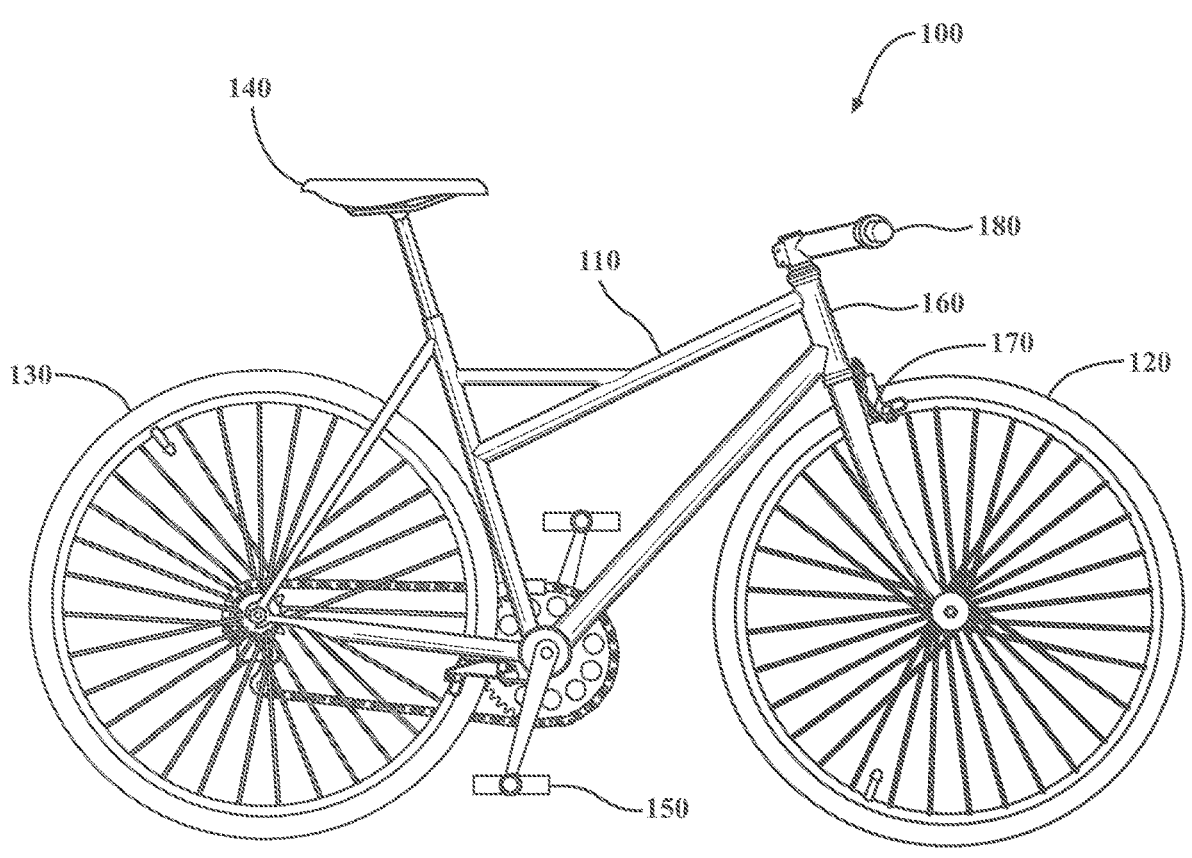
FIG. 1 is an example of a bicycle.

Referring to FIG. 1, a representative example of a bicycle 100 is shown. The bicycle can be any type of bicycle, now know or later developed. The bicycle 100 can be entirely manually operated. In some arrangements, the bicycle 100 can be an electric bicycle or a motorized bicycle. The bicycle 100 includes a frame 110, which can be any kind of bicycle frame, now known or later developed. The frame 110 can be operatively connected to a front wheel 120, a rear wheel 130, a saddle 140, and a pedal assembly 150. As used herein, the term "operatively connected" can include direct or indirect connections, including connections without direct physical contact. The saddle 140 can be a seat. The saddle 140 can be configured to support a rider of the bicycle 100 when he or she is riding the bicycle 100. The pedal assembly 150 can be used by the rider to rotate the rear wheel 130 to propel the bicycle 100 along the ground. The frame 110 can also include a front steering axle 160, a front fork assembly 170, and a handlebar assembly 180. The front steering axle 160 can be operatively connected to the front fork assembly 170 and the handlebar assembly 180, and the front fork assembly 170 can be operatively connected to the front wheel 120. Rotation of the handlebar assembly 180 by the rider can cause rotation of the front steering axle 160, which, in turn, can cause the front fork assembly 170 to rotate. Rotation of the front fork assembly 170 can cause rotation of the front wheel 120. In this way, the rider can steer the bicycle 100.

The bicycle 100 can also include a bicycle seat suspension. The bicycle seat suspension can include one or more vibration isolators for isolating the rider from vibrations transferred to the rider as the bicycle 100 moves along a surface during use. As described herein in further detail below, the vibration isolator(s) include conical springs having a near-zero region of their stress-strain curve (e.g., a quasi-zero stiffness region (QZS region)). The QZS region has the effect of isolating vibrations rather than dampening vibrations.

Referring to FIGS. 2A-2D, an example of a bicycle seat suspension 200 is shown. The bicycle seat suspension 200 can include one or more body members 210. The one or more body members 210 are configured to be operatively connected to the saddle 140. The one or more body members 210 can be movable. In one or more arrangements, the one or more body members 210 can include four body members 210. For example, the four body members 210 can include a first body member 210a, a second body member 210b, a third body member 210c, and a fourth body member 210d. The four body members 210a, 210b, 210c, and 210d can be configured as a four-bar linkage 220. The four-bar linkage 220 can have any suitable size, shape, and/or configuration. In one or more arrangements, the four-bar linkage 220 can be substantially rectangular, substantially square, substantially parallelogram, substantially trapezoid, substantially quadrilateral, substantially triangular, or substantially polygonal in confirmation. The four-bar linkage 220 can define an open interior space 280. However, it will be appreciated that a four-bar linkage is merely one example of a configuration for the body members 210. Indeed, the body members 210 can form any constrained kinematic chain or linkage.

In one or more arrangements, the four body members 210a, 210b, 210c, and 210d can be separate pieces that are subsequently operatively connected to each other. Any suitable form of operative connection can be used, including, for example, one or more welds, one or more fasteners, one or more adhesives, and/or one or more forms of mechanical engagement, or any combination thereof, just to name a few possibilities. In some arrangements, the body members 210 that intersect can be operatively connected by one or more fasteners 230. In some arrangements, the fasteners 230 can permit relative movement between the intersecting body members 210, such as relative pivoting or rotational movement. In one or more arrangements, the fasteners 230 can be screws, bolts, pins, rivets, connectors, or anchors, just to name a few possibilities. In some arrangements, the four body members 210a, 210b, 210c, and 210d can be formed as a single unitary structure.

The body members 210a, 210b, 210c, and 210d can have any suitable size, shape, and/or configuration. For instance, the body members 210a, 210b, 210c, and 210d can be hollow, or the body members 210a, 210b, 210c, and 210d can be solid. In some arrangements, the body members 210a, 210b, 210c, and 210d can be substantially rectangular, but it will be appreciated that other shapes are possible. The body members 210a, 210b, 210c, and 210d can be substantially identical to each other, or one or more of the segments can be different from the other body members in one or more respects. The body members 210a. 210b, 210c, and 210d can be made of any suitable material. In some arrangements, the body members 210a, 210b, 210c, and 210d can be made of any suitable plastic, metal, or alloy, just to name a few possibilities.

The one or more body members 210 can be configured to change configuration when a load is applied to the saddle 140. For example, the one or more body members 210 can change configuration from an unloaded configuration 240 shown in FIGS. 2A and 2C to a loaded configuration 250 shown in FIGS. 2B and 2D. In the unloaded configuration 240, there is no load applied to the saddle 140. For example, the unloaded configuration 240 can occur when there is no rider of the bicycle 100 sitting on the saddle 140. In the loaded configuration, there is a load applied to the saddle 140. For example, the loaded configuration 250 can occur when there is a rider of the bicycle 100 sitting on the saddle 140. In the unloaded configuration 240, the one or more body members 210 can define an open interior space 280. In the loaded configuration 250, the one or more body members 210 can be compressed together such that the one or more body members 210 do not define an open interior space 280, or such that the one or more body members 210 define a smaller open interior space 280 than in the unloaded configuration 240. When the one or more body members 210 change configuration, the one or more body members 210 can be configured to move (e.g., rotate) when a load is applied to the saddle 140. For example, referring to FIGS.

2B and 2D, when the one or more body members 210 change configuration, they can rotate about one of the fasteners 230, and the fastener 230 can move along an arc A. It will be appreciated that other types of motion of the body member (s) 210 is possible.

The bicycle seat suspension 200 can also include a vibration isolator 260. The vibration isolator 260 can be operatively positioned with respect to the one or more body members 210 such that the one or more body members 210 can engage the vibration isolator 260 when the one or more body members 210 change configuration. For example, responsive to a load being applied to the saddle 140, the one or more body members 210 can change configuration from the unloaded configuration 240, in which the vibration isolator 260 is not engaged by at least one of the one or more body members 210, to the loaded configuration 250, in which the vibration isolator 260 is engaged by at least one of the one or more body members 210. As used herein, when the vibration isolator 260 is "engaged," the vibration isolator 260 is pressed, compressed, squeezed, compacted, other otherwise pushed substantially along a longitudinal axis 270 of the vibration isolator 260.

The bicycle seat suspension 200 can also include a vibration isolator support 295, shown in FIGS. 2A-2D. The vibration isolator support 295 can have any suitable size, shape, and/or configuration. In one or more arrangements, the vibration isolator support 295 can be operatively connected to the frame 110. The vibration isolator 260 can be supported by the vibration isolator support 295. In some arrangements, the vibration isolator 260 can be operatively connected to the vibration isolator support 295. The vibration isolator support 295 can be operatively connected to the saddle 140 and/or the one or more body members 210. When the vibration isolator 260 is engaged, the vibration isolator 260 can be compressed between the one or more body members 210 and the vibration isolator support 295. In some arrangements, when the one or more body members 210 engage the vibration isolator 260, one of the fasteners 230 can slide along a top surface of the vibration isolator 260. When the vibration isolator 260 is engaged, the vibration isolator 260 can isolate a person seated on the saddle 140 from vibrations transferred through the saddle 140 or transferred through any other component of the bicycle 100.

Figure 2A:
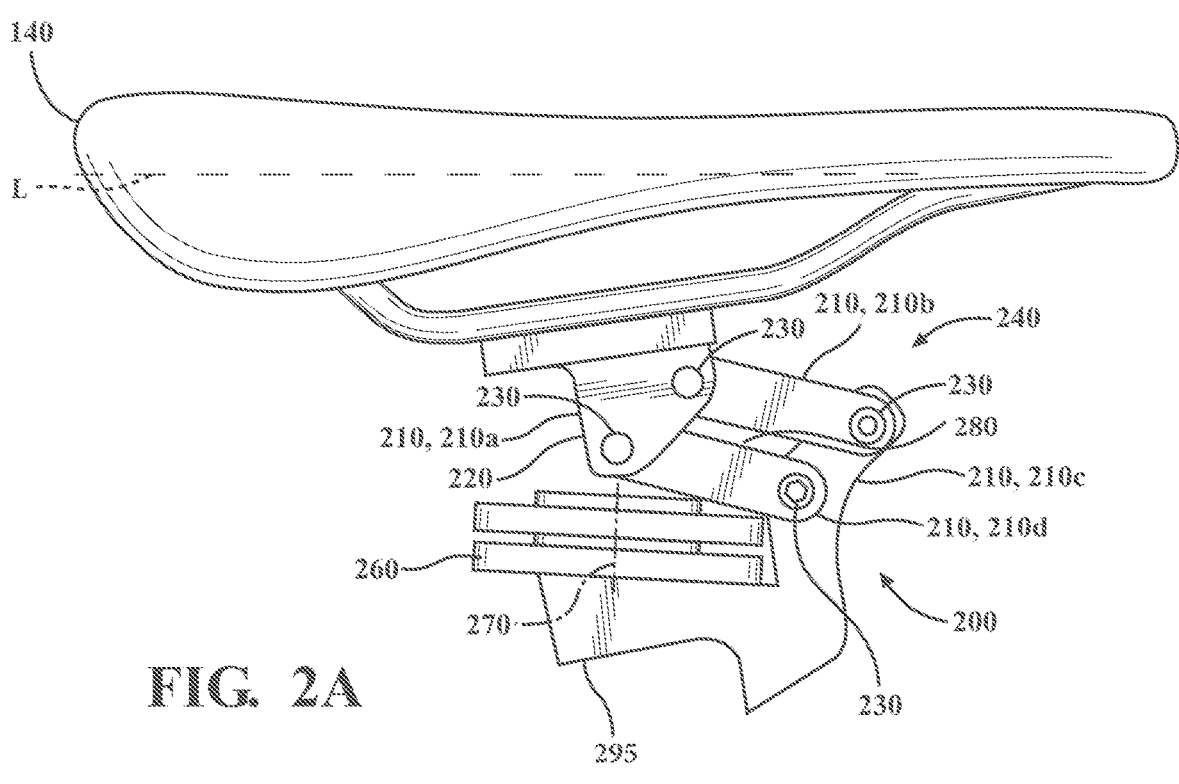
FIG. 2A is an example of a bicycle seat suspension in an unloaded configuration, where the bicycle seat suspension includes a single vibration isolator.
Figure 2B:
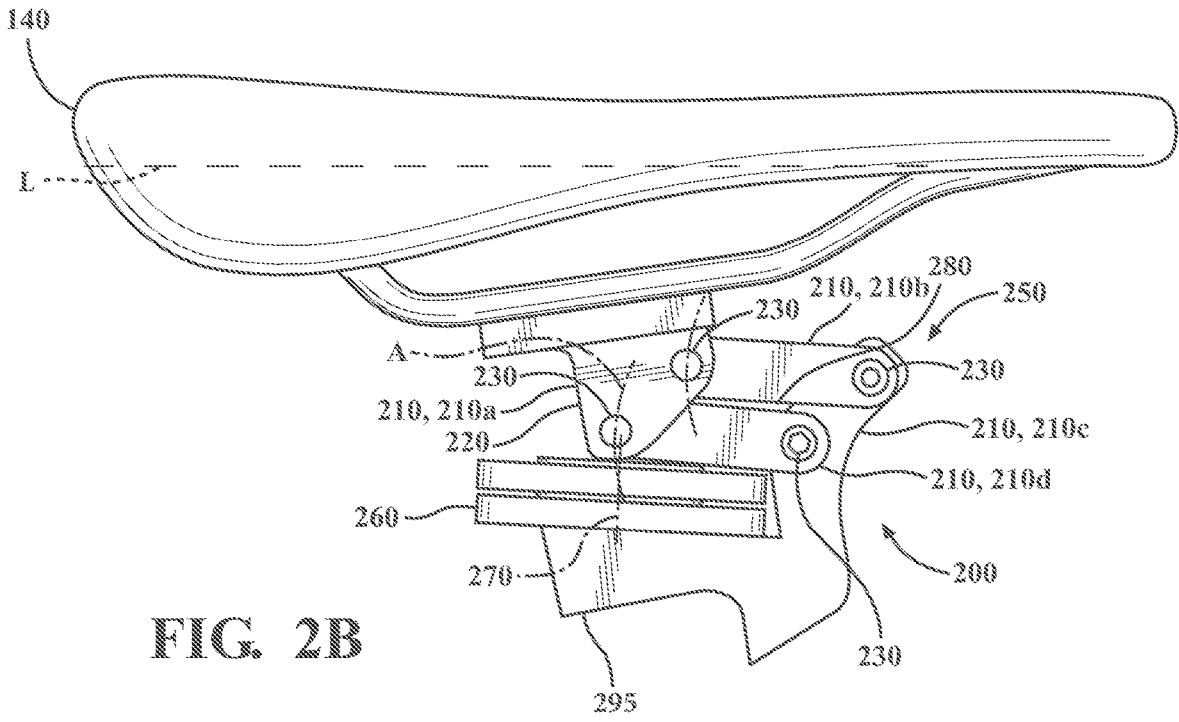
FIG. 2B is an example of the bicycle seat suspension of FIG. 2A in a loaded configuration.
Figure 2C:
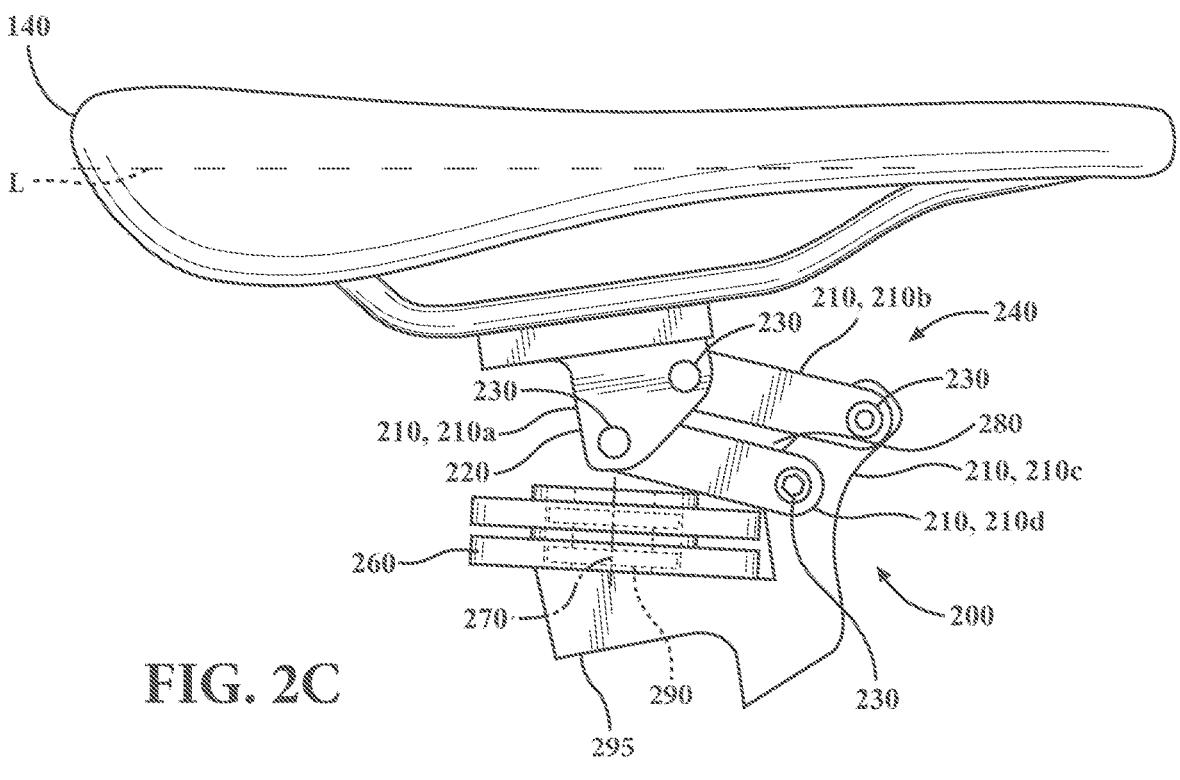
FIG. 2C is an example of another bicycle seat suspension in an unloaded configuration, where the bicycle seat suspension includes a first vibration isolator and a second vibration isolator located within the first vibration isolator.
Figure 2D:
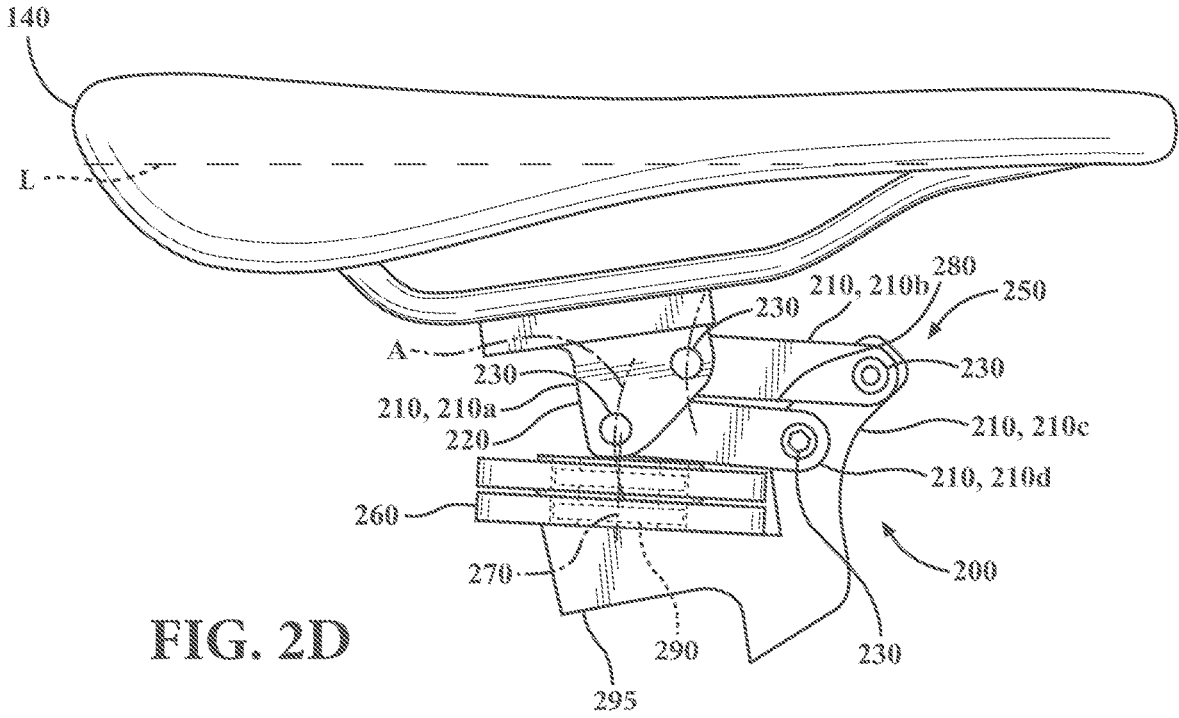
FIG. 2D is an example of the bicycle seat suspension of FIG. 2C in a loaded configuration.

Referring now to FIGS. 2C and 2D, in some arrangements, the vibration isolator 260 can be a first vibration isolator 260, and the bicycle seat suspension 200 can include a second vibration isolator 290. The first vibration isolator 260 can include a hollow interior, as described in further detail below, and the second vibration isolator 290 can be located within the hollow interior of the first vibration isolator 260. The first vibration isolator 260 and the second vibration isolator 290 can be similar in one or more respects. For example, the first vibration isolator 260 and the second vibration isolator 290 can have the same vibration isolation characteristics, the same vibration isolation performance, the same number of conical springs, the same longitudinal axis 270, and/or any other similar aspects. In other arrangements, the first vibration isolator 260 and the second vibration isolator 290 can be different in one or more respects. For example, the first vibration isolator 260 and the second vibration isolator 290 can have different vibration isolation characteristics, different vibration isolation performance, different numbers of conical springs, different longitudinal axes, different sizes, and/or any other different aspects.

In some instances, the top surface of the first vibration isolator 260 and the top surface of the second vibration isolator 290 can be aligned such that when the one or more body members 210 engage the first vibration isolator 260, the one or more body members 210 also engage the top surface of the second vibration isolator 290. As a result, both the first vibration isolator 260 and the second vibration isolator 290 can be engaged simultaneously. Moreover, in at least some instances, when the one or more body members 210 change configuration from the unloaded configuration 240 to the loaded configuration 250, one of the fasteners 230 can slide along a top surface of the first vibration isolator 260 and a top surface of the second vibration isolator 290.

Referring now to FIGS. 3A-3D, a second embodiment of a bicycle seat suspension 300 is shown. The bicycle seat suspension 300 can include a plurality of body members 310. The plurality of body members 310 are configured to be operatively connected to the saddle 140. The plurality of body members 310 can be movable. In one or more arrangements, the plurality of body members 310 can include six body members 310. For example, the body members 310 can include a first body member 310a, a second body member 310b, a third body member 310c, a fourth body member 310d, a fifth body member 310e, and a sixth body member 310f. The six body members 310a, 310b, 310c, 310d, 310e, and 310f can be configured as separate linkages 320. The bicycle seat suspension 300 can include any suitable number of separate linkages 320. For example, the six body members 310a, 310b, 310c, 310d, 310e, and 310f can be configured as a first linkage 320a and a second linkage 320b. The first linkage 320a can be separate from the second linkage 320b. Thus, the first linkage 320a and the second linkage 320b may not directly connected to each other. In one or more arrangements, the first body member 310a, the second body member 310b, and the third body member 310c can form the first linkage 320a. In one or more arrangements, the fourth body member 310d, the fifth body member 310e, and the sixth body member 310f can form the second linkage 320b. However, the six body members 310a, 310b, 310c, 310d, 310e, and 310f can be arranged in any suitable manner to form the first linkage 320a and/or the second linkage 320b. In other arrangements, the six body members 310a, 310b, 310c, 310d, 310c, and 310f can form any suitable number of linkages 320. Further, the first linkage 320a and the second linkage 320b can have the same number of body members, or they can have a different number of body members. Further, the first linkage 320a and the second linkage 320b can be substantially identical to each other, or the first linkage 320a and the second linkage 320b can be different from each other in one or more respects. Moreover, it will be appreciated that the separate linkages are merely one example of a configuration for the body members 310. Indeed, the body members 310 can form any number of constrained kinematic chains or linkages suitable for vibration isolation.

In one or more arrangements, the six body members 310a, 310b, 310c, 310d, 310c, and 310f can be separate pieces that are subsequently operatively connected to each other. Any suitable form of operative connection can be used, including, for example, one or more welds, one or more fasteners, one or more adhesives, and/or one or more forms of mechanical engagement, or any combination thereof, just to name a few possibilities. In some arrangements, the body members 310 that intersect can be operatively connected by one or more fasteners 330. In some arrangements, the fasteners 330 can permit relative movement between the intersecting body members 310, such as relative pivoting or rotational movement. In one or more arrangements, the fasteners 330 can be screws, bolts, pins, rivets, connectors, or anchors, just to name a few possibilities. In some arrangements, the six body members 310a, 310b, 310c, 310d, 310c, and 310f can be formed as a single unitary structure.

The body members 310a, 310b, 310c, 310d, 310c, and 310f can have any suitable size, shape, and/or configuration. For instance, the body members 310a, 310b, 310c, 310d, 310e, and 310f can be hollow, or the body members 310a, 310b, 310c, 310d, 310e, and 310f can be solid. In some arrangements, the body members 310a, 310b, 310c, 310d, 310c, and 310f can be substantially rectangular, but it will be appreciated that other shapes are possible. The body members 310a, 310b, 310c, 310d, 310c, and 310f can be substantially identical to each other, or one or more of the segments can be different from the other body members in one or more respects. The body members 310a, 310b, 310c, 310d, 310c, and 310f can be made of any suitable material. In some arrangements, the body members 310a, 310b, 310c, 310d, 310e, and 310f can be made of any suitable plastic, metal, or alloy, just to name a few possibilities.

The one or more body members 310 are configured to change configuration when a load is applied to the saddle 140. For example, the plurality of body members 310 can change configuration from an unloaded configuration 340 shown in FIGS. 3A and 3C to a loaded configuration 350 shown in FIGS. 3B and 3D. In the unloaded configuration 340, there is no load applied to the saddle 140. For example, the unloaded configuration 340 can occur when there is no rider of the bicycle 100 sitting on the saddle 140. In the loaded configuration, there is a load applied to the saddle 140. For example, the loaded configuration 350 can occur when there is a rider of the bicycle 100 sitting on the saddle 140. When the plurality of body members 310 change configuration, one or more of the plurality of body members 310 can be configured to move (e.g., rotate) when a load is applied to the saddle 140. For example, referring to FIGS. 3B and 3D, when the one or more body members 210 change configuration, they can rotate about the fasteners 330, and each of the fasteners 330 can move along an arc A. The bicycle seat suspension 300 also includes one or more vibration isolators. The one or more vibration isolator(s) are operatively positioned with respect to the plurality of body members 310 such that the plurality of body members 310 engage the vibration isolator(s) when the plurality of body members 310 are loaded. For example, responsive to a load being applied to the saddle 140, the plurality of body members 310 can change configuration from the unloaded configuration 340, in which the vibration isolator(s) are not engaged, to the loaded configuration 350, in which the vibration isolator(s) are engaged. When the vibration isolator(s) are engaged, the vibration isolator(s) can isolate a person seated on the saddle 140 from vibrations transferred through the saddle 140.

In one or more arrangements, the bicycle seat suspension 300 can include a first vibration isolator 360. The first vibration isolator 360 can be operatively positioned with respect to the first linkage 320a such that when the bicycle seat suspension 300 is in the loaded configuration 350, the first linkage 320a engages the first vibration isolator 360. Thus, when the plurality of body members 310 engage the first vibration isolator 360, the fastener 330 can slide along a top surface of the first vibration isolator 360. When the first vibration isolator 360 is engaged, the first vibration isolator 360 can isolate a person seated on the saddle 140 from vibrations transferred through the saddle 140 or transferred through any other component of the bicycle 100. Additionally or alternatively, in one or more arrangements, the bicycle seat suspension 300 can include a second vibration isolator 370. The second vibration isolator 370 can be operatively positioned with respect to the second linkage 320b such that when the bicycle seat suspension 300 is in the loaded configuration 350, the second linkage 320b engages the second vibration isolator 370. Thus, when the plurality of body members 310 engages the second vibration isolator 370, the fastener 330 can slide along a top surface of the second vibration isolator 370. When the second vibration isolator 370 is engaged, the second vibration isolator 370 can isolate a person seated on the saddle 140 from vibrations transferred through the saddle 140 or transferred through any other component of the bicycle 100.

Figure 3A:
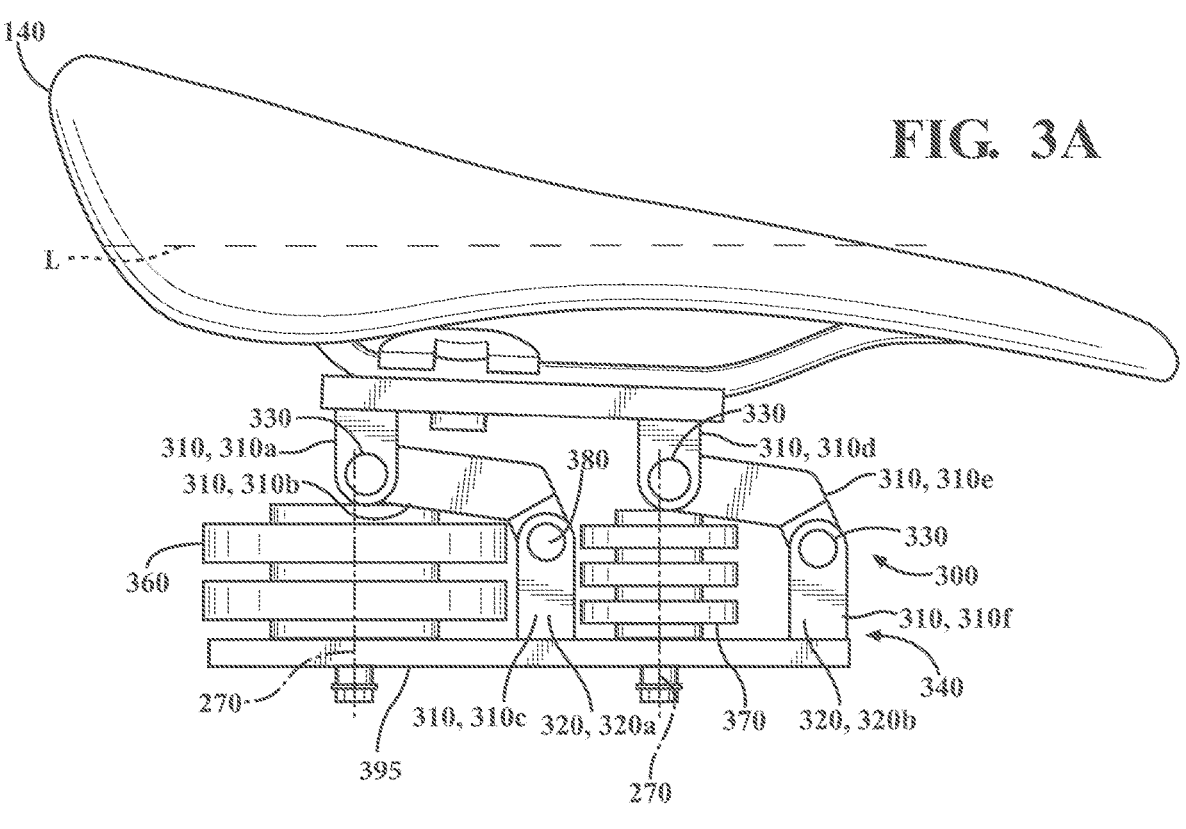
FIG. 3A is an example of a bicycle seat suspension in an unloaded configuration, where the bicycle seat suspension includes a first vibration isolator and a second vibration isolator.
Figure 3B:
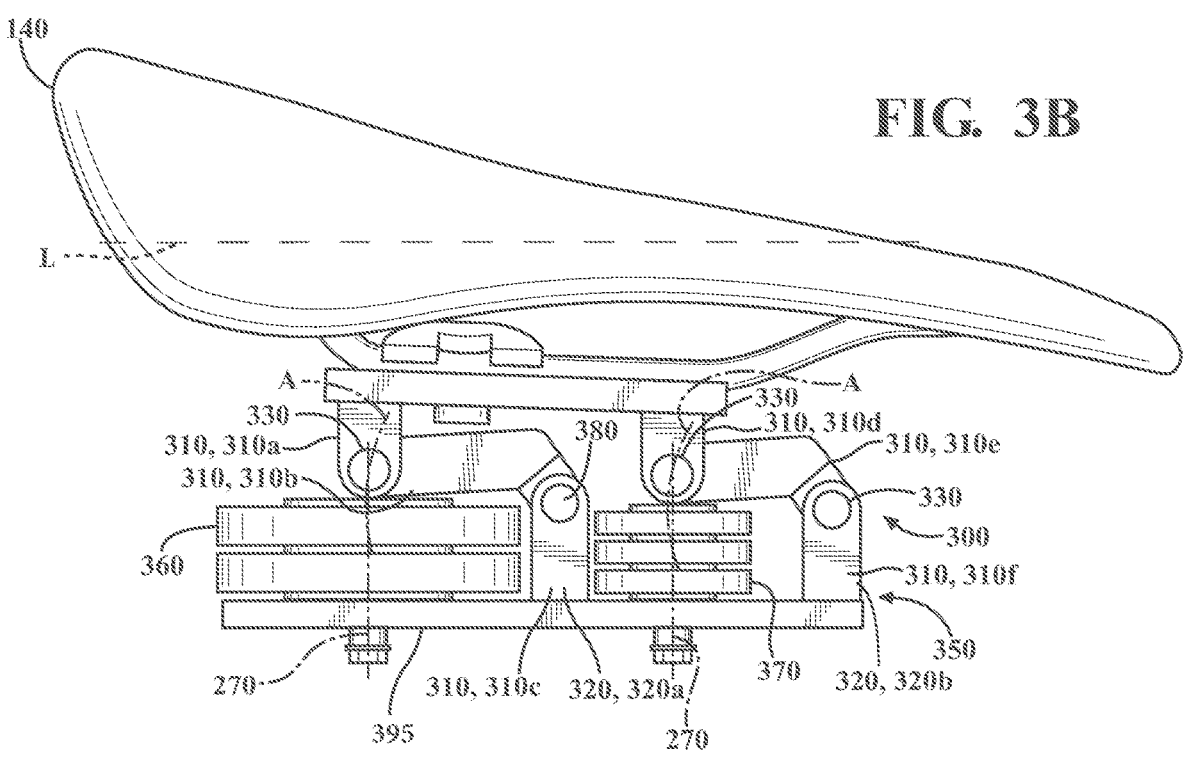
FIG. 3B is an example of the bicycle seat suspension of FIG. 3A in a loaded configuration.

The bicycle seat suspension 300 can also include a vibration isolator support 395, shown in FIGS. 3A-3D. The vibration isolator support 395 can have any suitable size, shape, and/or configuration. In one or more arrangements, the vibration isolator support 395 can be operatively connected to the frame 110. Referring to FIGS. 3A and 3B, the first vibration isolator 360 and/or the second vibration isolator 370 can be supported by the vibration isolator support 395. In some arrangements, the first vibration isolator 360 and/or the second vibration isolator 370 can be operatively connected to the vibration isolator support 395. The vibration isolator support 395 can be operatively connected to the saddle 140 and/or the plurality of body members 310. When the first vibration isolator 360 and/or the second vibration isolator 370 are engaged, the first vibration isolator 360 and/or the second vibration isolator 370 can be compressed between the plurality of body members 310 and the vibration isolator support 395.

In arrangements in which the bicycle seat suspension 300 includes both the first vibration isolator 360 and the second vibration isolator 370, the first vibration isolator 360 and the second vibration isolator 370 can be spaced apart in a longitudinal direction L of the saddle 140. The longitudinal direction L of the saddle 140 can generally extend in the front-back direction of the saddle 140 in its normal usage orientation.

Figure 3C:
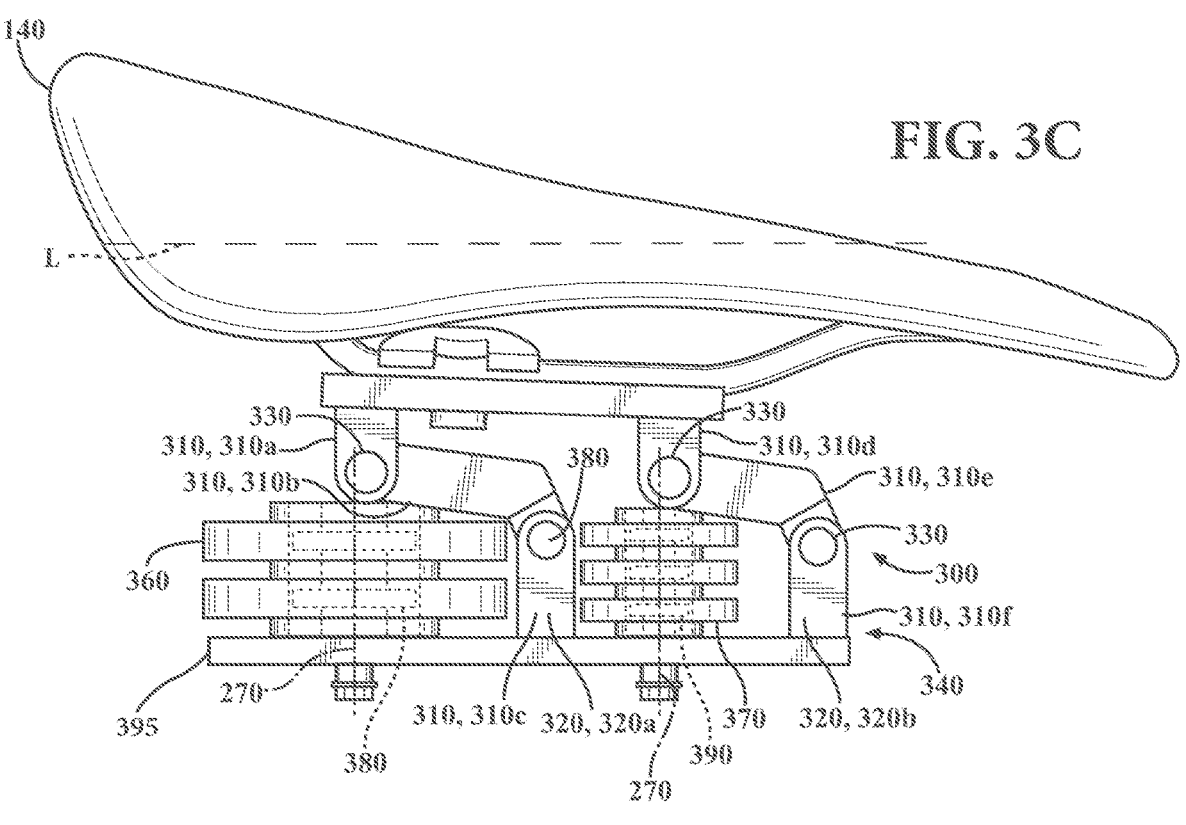
FIG. 3C is an example of another bicycle seat suspension in an unloaded configuration, where the bicycle seat suspension includes a first vibration isolator, a second vibration isolator, a third vibration isolator located within the first vibration isolator, and a fourth vibration isolator located within the second vibration isolator.
Figure 3D:
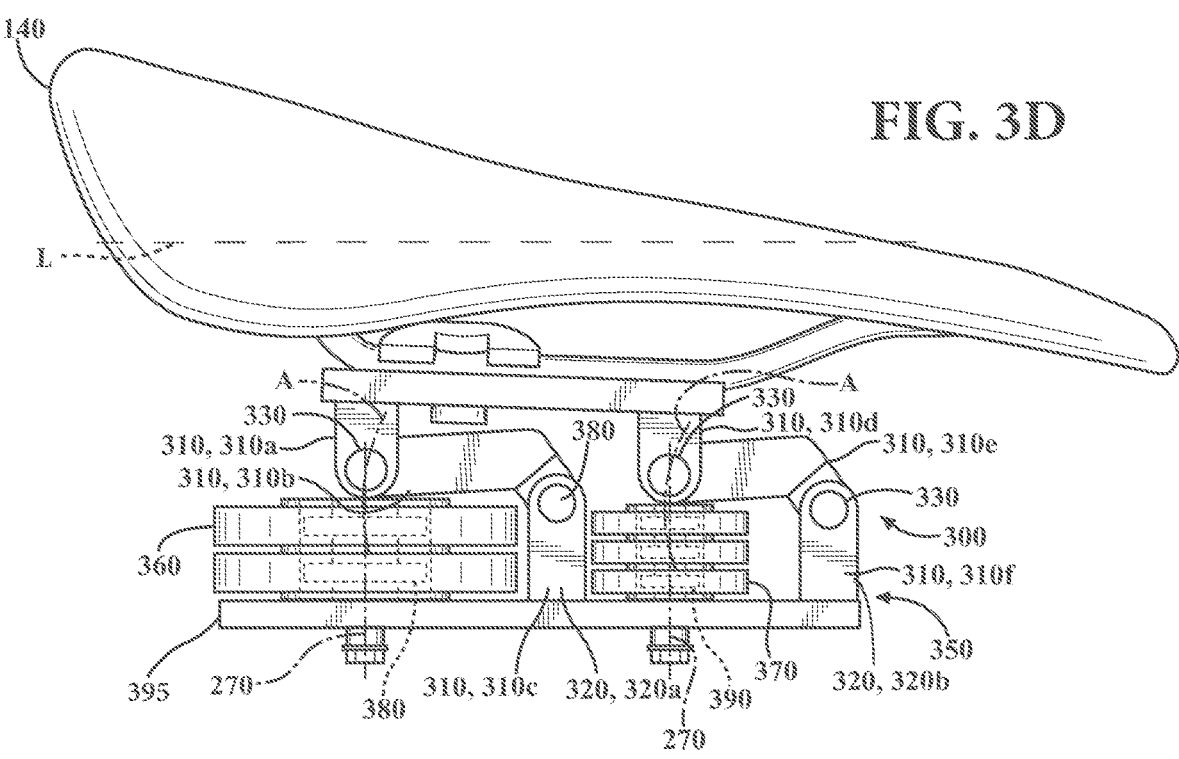
FIG. 3D is an example of the bicycle seat suspension of FIG. 3C in a loaded configuration.

Referring now to FIGS. 3C and 3D, in one or more arrangements, the bicycle seat suspension 300 can include a third vibration isolator 380. The third vibration isolator 380 can be located within the first vibration isolator 360. Thus, the first and third vibration isolators 360, 380 can be in a nested arrangement. The third vibration isolator 380, like the first vibration isolator 380, can be operatively positioned with respect to the first linkage 320a such that when the bicycle seat suspension 300 is in the loaded configuration 350, the first linkage 320a engages the third vibration isolator 380. In some instances, the top surface of the first vibration isolator 360 and the top surface of the third vibration isolator 380 can be aligned such that when the plurality of body members 310 engages the first vibration isolator 360, the plurality of body members 310 also engages the top surface of the third vibration isolator 380. As a result, both the first vibration isolator 360 and the third vibration isolator 380 can be engaged simultaneously when the plurality of body members 310 changes configuration from the unloaded configuration 340 to the loaded configuration 350. Moreover, when the plurality of body members 310 changes configuration from the unloaded configuration 340 to the loaded configuration 350, the fasteners 330 can slide along a top surface of the first vibration isolator 360 and a top surface of the third vibration isolator 380.

Additionally or alternatively, in one or more arrangements, the bicycle seat suspension 300 can include a fourth vibration isolator 390. The fourth vibration isolator 390 can be located within the second vibration isolator 370. Thus, the second and fourth vibration isolators 370, 390 can be in a nested arrangement. The fourth vibration isolator 390, like the second vibration isolator 370, can be operatively positioned with respect to the second linkage 320b such that when the bicycle seat suspension 300 is in the loaded configuration 350, the second linkage 320b engages the fourth vibration isolator 390. In some instances, the top surface of the second vibration isolator 370 and the top surface of the fourth vibration isolator 390 can be aligned such that when the plurality of body members 310 engages the second vibration isolator 370, the plurality of body members 310 also engages the top surface of the fourth vibration isolator 390. As a result, both the second vibration isolator 370 and the fourth vibration isolator 390 can be engaged simultaneously when the plurality of body members 310 changes configuration from the unloaded configuration 340 to the loaded configuration 350. Moreover, when the plurality of body members 310 changes configuration from the unloaded configuration 340 to the loaded configuration 350, the fasteners 330 can slide along a top surface of the second vibration isolator 370 and a top surface of the fourth vibration isolator 390.

Referring to FIGS. 3C and 3D, the first vibration isolator 360, the second vibration isolator 370, the third vibration isolator 380, and/or the fourth vibration isolator 390 can be supported by the vibration isolator support 395. In some arrangements, the first vibration isolator 360, the second vibration isolator 370, the third vibration isolator 380, and/or the fourth vibration isolator 390 can be operatively connected to the vibration isolator support 395. When the first vibration isolator 360, the second vibration isolator 370, the third vibration isolator 380, and/or the fourth vibration isolator 390 are engaged, the first vibration isolator 360, the second vibration isolator 370, the third vibration isolator 380, and/or the fourth vibration isolator 390 can be compressed between the plurality of body members 310 and the vibration isolator support 395.

The first vibration isolator 360, the second vibration isolator 370, the third vibration isolator 380, and/or the fourth vibration isolator 390 can be similar in one or more respects. For example, the first vibration isolator 360, the second vibration isolator 370, the third vibration isolator 380, and/or the fourth vibration isolator 390 can have the same vibration isolation characteristics, the same vibration isolation performance, the same number of conical springs, the same longitudinal axis 270, and/or any other similar aspects. In other arrangements, the first vibration isolator 360, the second vibration isolator 370, the third vibration isolator 380, and/or the fourth vibration isolator 390 can be different in one or more respects. For example, the first vibration isolator 360, the second vibration isolator 370, the third vibration isolator 380, and/or the fourth vibration isolator 390 can have different vibration isolation characteristics, different vibration isolation performance, different numbers of conical springs, different longitudinal axes, different sizes, and/or any other different aspects.

As mentioned above, in one or more arrangements, the bicycle seat suspension 300 can include either the first vibration isolator 360 or the second vibration isolator 370. In one or more other arrangements, the bicycle seat suspension 300 can include both the first vibration isolator 360 and the second vibration isolator 370. In one or more other arrangements, the bicycle seat suspension 300 can include both the first vibration isolator 360 and the second vibration isolator 370 and either the third vibration isolator 380 or the fourth vibration isolator 390. In one or more other arrangements, the bicycle seat suspension can include the first vibration isolator 360, the second vibration isolator 370, the third vibration isolator 380, and the fourth vibration isolator 390. In still other arrangements, the bicycle seat suspension 300 can include any suitable number of a plurality of vibration isolators such that when the one or more body members engage the plurality of vibration isolators, the one or more body members compress each of the plurality of vibration isolators substantially along a longitudinal axis of each of the plurality of vibration isolators.

Figure 4:
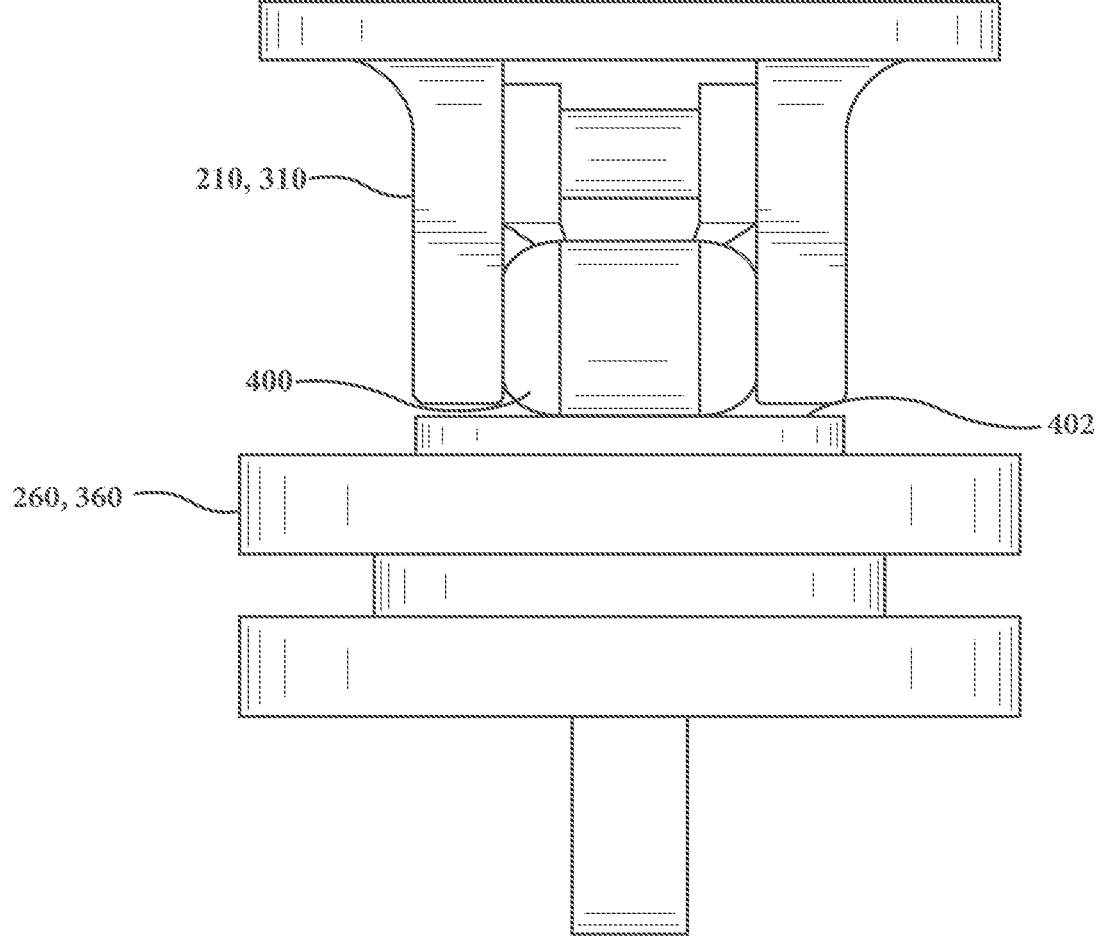
FIG. 4 is an example of a portion of the bicycle seat suspension, showing a roller.

Referring now to FIG. 4, in some instances, when the fasteners 230, 330 slide along a top surface of the vibration isolator(s), friction can be generated within the bicycle seat suspension 200, 300. This can cause wear and tear of the components of the bicycle seat suspension 200, 300, a decreased performance of the bicycle seat suspension 200, 300, and/or unwanted noise when using the bicycle seat suspension 200, 300. Accordingly, to reduce the amount of friction generated in the bicycle seat suspension 200, 300, the bicycle seat suspension 200, 300 can include a roller 400, as shown in FIG. 4. The roller 400 can be operatively connected to the one or more body members 210, 310 and operatively positioned such that when the one or more body members 210, 310 engage the vibration isolator(s), the roller 400 rolls across a top surface 402 of the vibration isolator(s). In some arrangements, the vibration isolator(s) and/or the roller 400 can include a low-friction and/or wear-resistant coating to further reduce the amount of friction generated when these components contact each other.

Figure 5A:
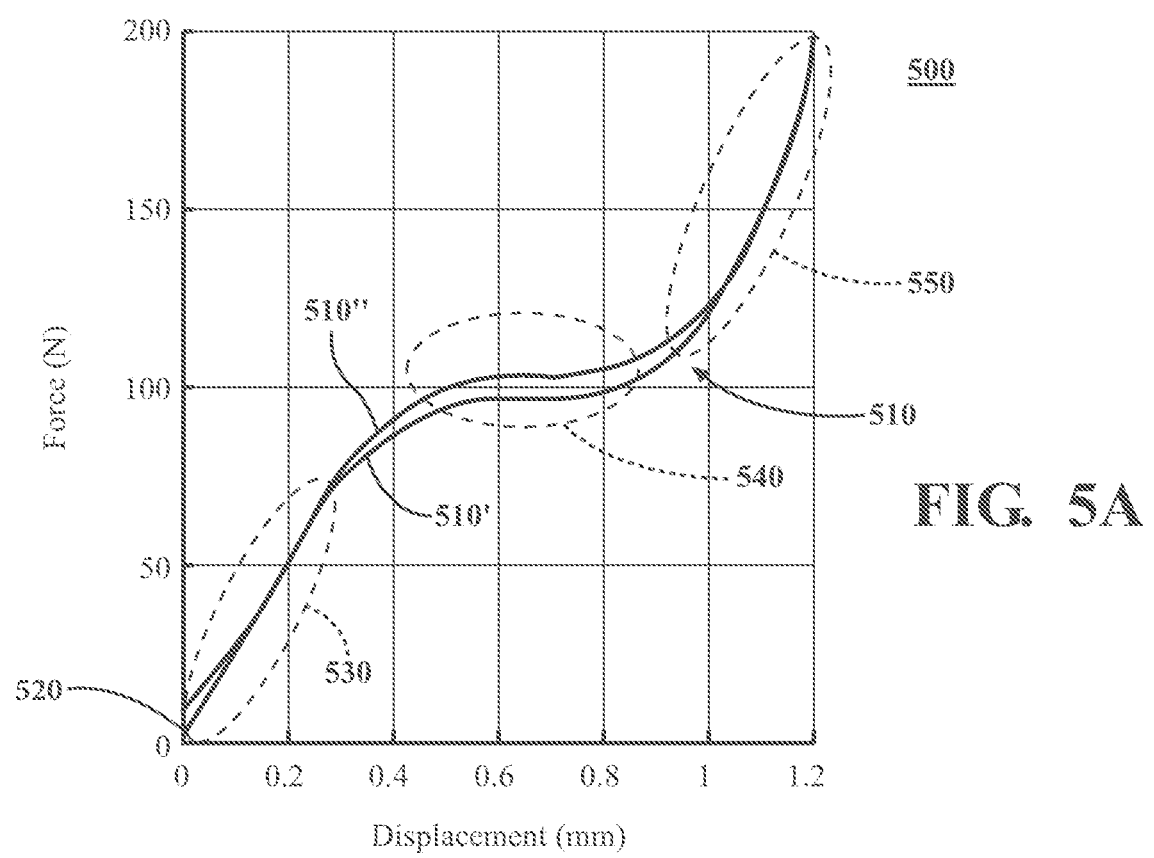
FIG. 5A is an example of a force-deflection curve of a conical spring.
Figure 5B:
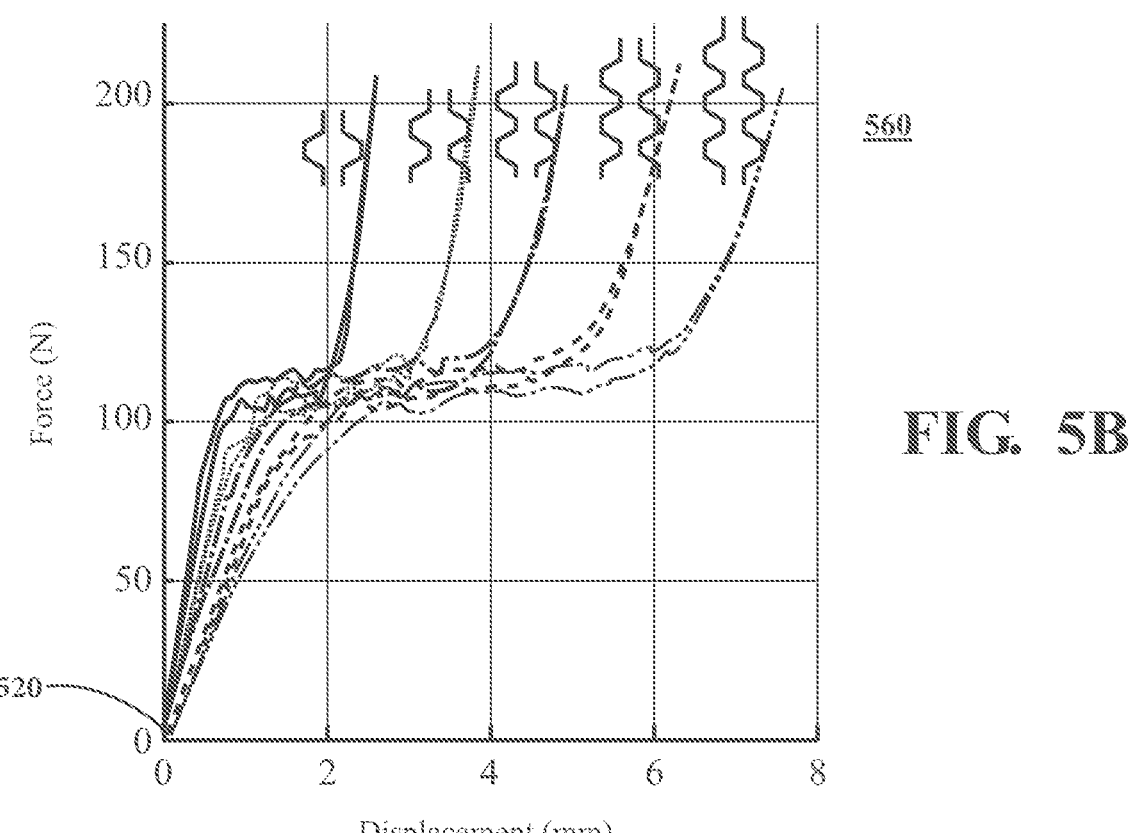
FIG. 5B is an example of the force-deflection curve for various stacks of a plurality of conical springs.

Referring now to FIGS. 5A and 5B, the vibration isolator(s) can be configured to exhibit a non-linear stiffness profile. The non-linear stiffness profile can include a region of quasi-zero stiffness. An example of a force-deflection graph 500 for this type of actuator is shown in FIG. 5A. It is noted that this force-deflection graph 500 is merely an example, as the values will vary depending on various characteristics of the vibration isolator(s). However, the general shape of a force-deflection curve 510, representing the stiffness profile, is shown. Starting from the origin 520, the vibration isolator can exhibit an initial stiffness region 530 that is substantially linear. The vibration isolator(s) are relatively stiff in the initial stiffness region 530. When load is reached, the force-deflection curve 510 can become zero or substantially zero, which is a quasi-zero stiffness region 540. The quasi-zero stiffness region 540 can allow for good vibration isolation. Continuing beyond the quasi-zero stiffness region 540, the force-deflection curve 510 can have a subsequent stiffness region 550 that is substantially linear. The vibration isolator(s) are relatively stiff in the subsequent stiffness region 550. It should be noted that there are two force-deflection curves shown in FIG. 5A. A first force-deflection curve 510' represents the vibration isolator(s) going from a non-loaded configuration to a loaded configuration. A second force deflection curve 510" represents the vibration isolator(s) going from a loaded configuration to a non-loaded configuration.

According to arrangements herein, the vibration isolator(s) can include a stack of the plurality of conical springs 600. It should be noted that other terms can be used to describe the conical springs 600 such as Belleville washes, disk springs, conical disks, etc. As more conical springs are added to the stack, the quasi-zero stiffness region 540 of the force-deflection curve 510 can be extended. An example of a force-deflection graph 560 depicting this effect is shown in FIG. 5B. As is evident, the length of the quasi-zero stiffness region increases as the number of conical springs 600 used in the stack increases.

Figure 6:
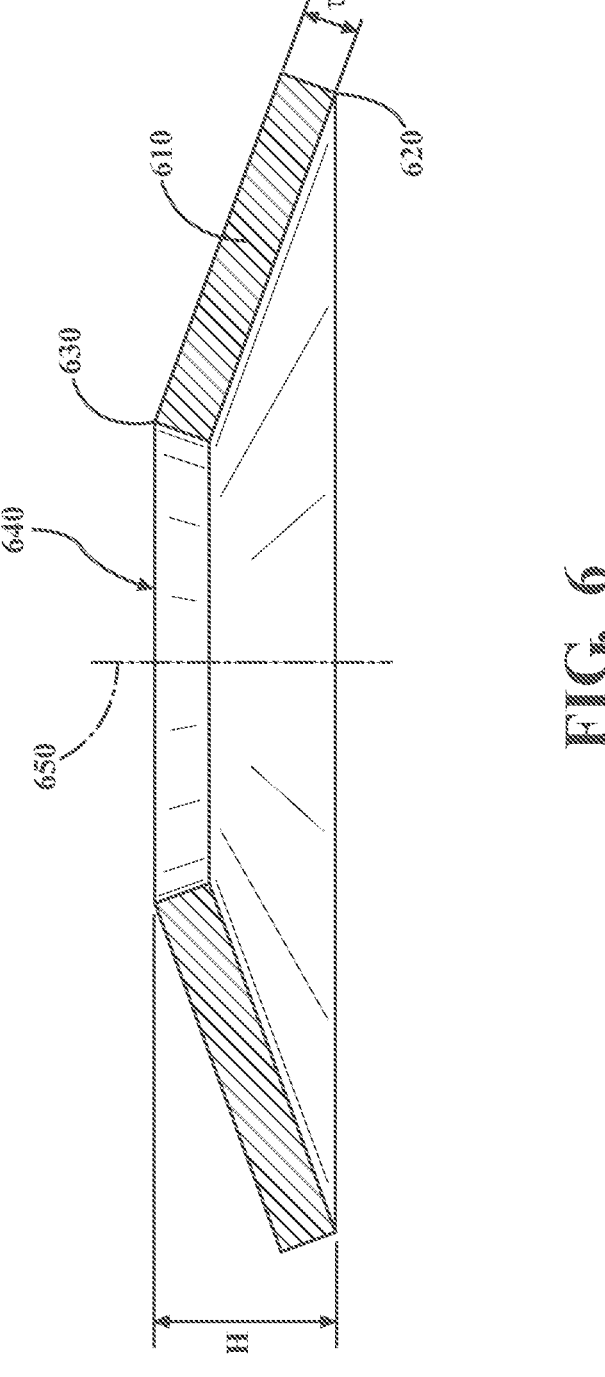
FIG. 6 is a cross-sectional view of an example of a conical spring.

Referring to FIG. 6, an example of a conical spring 600 is shown. The conical spring 600 can have a body 610 with a substantially conical shape. The conical spring 600 can include an outer diameter body portion 620 and an inner diameter body portion 630. The outer diameter body portion 620 can be larger than the inner diameter body portion 630. The conical spring 600 can have a central aperture 640. The conical spring 600 can have a central axis 650. The conical spring can have a height H and a thickness λ. In some arrangements, the conical spring 600 can have a ratio of height H to the thickness λ of about 1 to about 2, about 1.2 to about 1.8, about 1.3 to about 1.5. In some arrangements, the ratio of height H to the thickness λ can be about 1.41.

A plurality of the conical springs 600 can be arranged in any suitable manner in a stack. For instance, in one or more arrangements, the plurality of the conical springs 600 can be arranged in an alternating pattern. For example, the outer diameter body portion 620 of one conical spring 600 can face the outer diameter body portion 620 of a neighboring conical spring 600. Alternatively or additionally, the inner diameter body portion 630 of a conical spring 600 can face the inner diameter body portion 630 of a neighboring conical spring 600. The central apertures 640 of the conical springs 600 can be substantially aligned with each other.

In some arrangements, the stack of the plurality of conical springs 600 does not include a central shaft passes through the central apertures 640 of the plurality of conical springs 600. Alternatively or additionally, the plurality of conical springs 600 does not include an outer sleeve that encloses the plurality of conical springs 600.

There are numerous ways in which the plurality of conical springs 600 can be arranged in a stack. Two examples will be provided herein. However, it will be understood that arrangements are not limited to the two examples described herein.

Referring to FIG. 7A, a first example of a vibration isolator 700 is shown in a cross-sectional view. The vibration isolator 700 can include a plurality of the conical springs 600 arranged in a stack 716. The stack 716 of the plurality of the conical springs 600 can have a first outermost conical spring 601 and a second outermost conical spring 602.

The vibration isolator 700 can further include a plurality of inner spacers 710 and a plurality of outer spacers 720. The inner spacers 710 can separate the inner diameter body portion 630 of neighboring pairs of the conical springs 600. The outer spacers 720 can separate the outer diameter body portion 620 of neighboring pairs of the conical springs 600. In some arrangements, the plurality of inner spacers 710 can be substantially identical to each other. In other arrangements, at least one of the inner spacers 710 can be different from the other inner spacers 710 in or more respects. In some arrangements, the plurality of outer spacers 720 can be substantially identical to each other. In other arrangements, at least one of the outer spacers 720 can be different from the other outer spacers 720 in or more respects.

The inner spacers 710 and the outer spacers 720 can be generally cylindrical members. In one or more arrangements, the inner spacers 710 and the outer spacers 720 can have a substantially t-shaped cross-sectional shape. Thus, the inner spacers 710 can include an inner wall portion 712 and a transverse ledge portion 714. The transverse ledge portion 714 can extend outwardly from the inner wall portion 712. The transverse ledge portion 714 can be substantially perpendicular to the inner wall portion 712. The outer spacers 720 can include an outer wall portion 722 and a transverse ledge portion 724. The transverse ledge portion 724 can extend inwardly from the outer wall portion 722.

The transverse ledge portion 724 can be substantially perpendicular to the outer wall portion 722.

The inner spacers 710 and the outer spacers 720 can be configured as non-locking spacers. Thus, the outer diameter body portion 620 of the conical springs 600 can rest on or contact the transverse ledge portion 724 of the outer spacers 720. Similarly, the inner diameter body portion 630 can rest on or contact the transverse ledge portion 714 of the inner spacers 710. Thus, the inner spacers 710 and the outer spacers 720 do not lockingly engage the conical springs 600.

The vibration isolator 700 can includes a first endcap 740 and a second endcap 750. The first endcap 740 can be operatively connected to and/or operatively positioned with respect to the first outermost conical spring 601 at a first end 701 of the stack 716. In some arrangements, one or more intermediate structures 703 can be located between the first endcap 740 and the first outermost conical spring 601. In other arrangements, the first endcap 740 and the first outermost conical spring 601 can directly contact each other. The second endcap 750 can be is operatively connected to and/or operatively positioned with respect to the second outermost conical spring 602 at a second end 702 of the stack 716. In some arrangements, one or more intermediate structures 704 can be located between the second endcap 750 and the second outermost conical spring 602. In other arrangements, the second endcap 750 and the first outermost conical spring 601 can directly contact each other.

In some arrangements, the first endcap 740 and the second endcap 750 can be substantially identical to each other. In other arrangements, the first endcap 740 and the second endcap 750 can be different from each other in one or more respects. The first endcap 740 and the second endcap 750 can be made of any suitable material.

Figure 7:
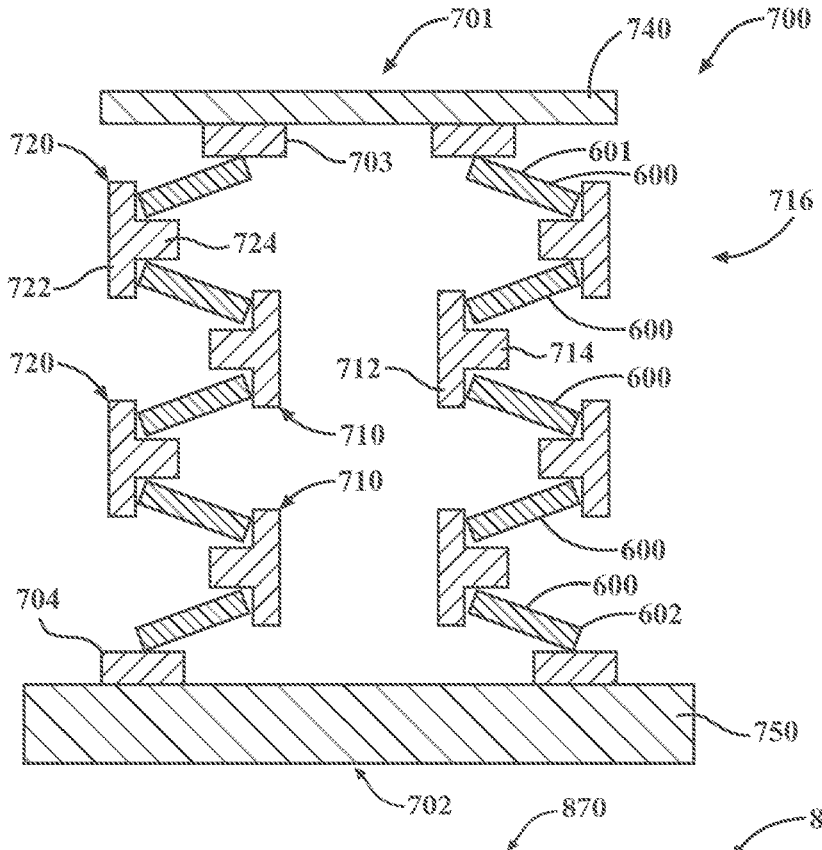
FIG. 7 is a cross-sectional view of a first example of a vibration isolator.

FIG. 7 shows the conical springs 600 in the stack 716 as being in a neutral position. However, as will be explained in more detail later, the vibration isolator can be configured to allow the conical springs 600 in the stack 716 to become flat or even inverted.

Figure 8:
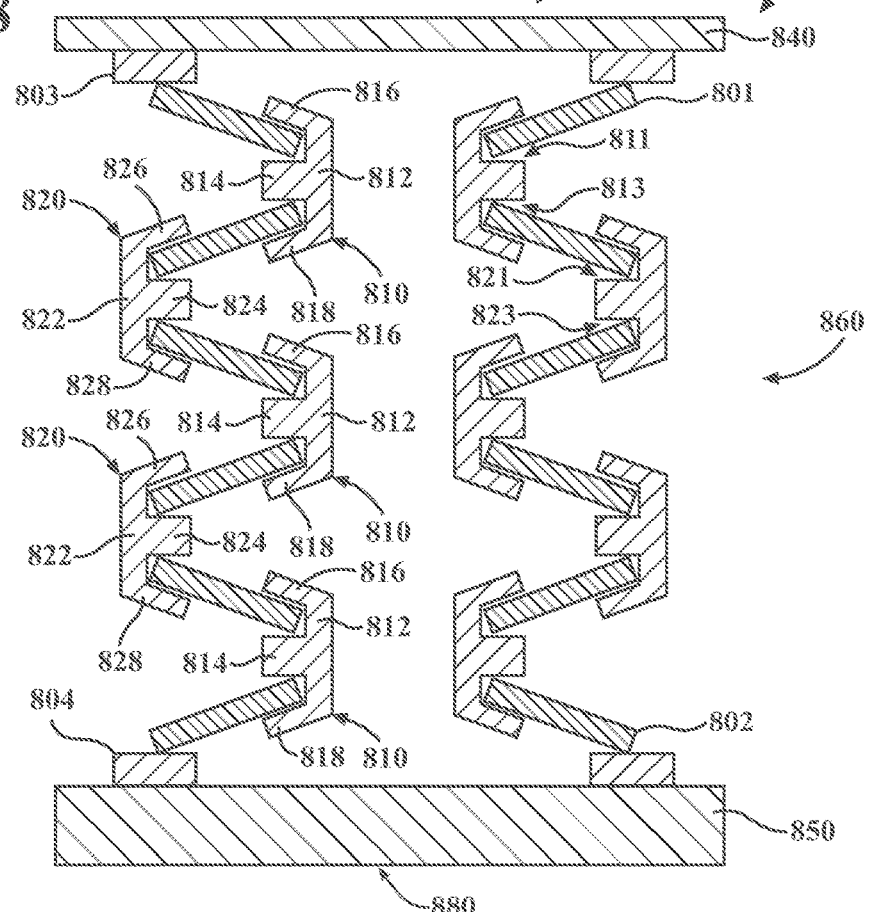
FIG. 8 is a cross-sectional view of a second example of a vibration isolator.

Referring to FIG. 8, a second example of the vibration isolator 800 is shown in a cross-sectional view. The vibration isolator 800 can include a plurality of the conical springs 600 arranged in a stack 860. The stack 860 of the plurality of the conical springs 600 can have a first outermost conical spring 801 and a second outermost conical spring 802.

The vibration isolator 800 can further include a plurality of inner spacers 810 and a plurality of outer spacers 820. The inner spacers 810 can separate the inner diameter body portion 630 of neighboring pairs of the conical springs 600. The outer spacers 820 can separate the outer diameter body portion 620 of neighboring pairs of the conical springs 600. In some arrangements, the plurality of inner spacers 810 can be substantially identical to each other. In other arrangements, at least one of the inner spacers 810 can be different from the other inner spacers 810 in or more respects. In some arrangements, the plurality of outer spacers 820 can be substantially identical to each other. In other arrangements, at least one of the outer spacers 820 can be different from the other outer spacers 820 in or more respects.

The inner spacers 810 and the outer spacers 820 can be generally cylindrical members. In one or more arrangements, the inner spacers 710 and the outer spacers 720 can have a substantially E-shaped or a substantially 3-shaped cross-sectional shape. Thus, the inner spacers 810 can include an inner wall portion 812, a central transverse ledge portion 814, an upper transverse ledge portion 816, and a lower transverse ledge portion 818. It will be appreciated that the terms "upper" and "lower" are used for convenience in this respect relative to the orientation of the inner spacers 810 shown in FIG. 8. However, it will be appreciated that the upper transverse ledge portion 816 and the lower transverse ledge portion 818 may not actually be above or below the central transverse ledge portion 814 depending on the orientation of the vibration isolator 800. A first groove 811 can be defined by the inner wall portion 812, the central transverse ledge portion 814, and the upper transverse ledge portion 816. A second groove 813 can be defined by the inner wall portion 812, the central transverse ledge portion 814, and the lower transverse ledge portion 818.

The central transverse ledge portion 814 can extend outwardly from the inner wall portion 812. The central transverse ledge portion 814 can be substantially perpendicular to the inner wall portion 812. In some arrangements, the upper transverse ledge portion 816 and the lower transverse ledge portion 818 can be non-parallel to the central transverse ledge portion 814. In some arrangements, the upper transverse ledge portion 816 and the lower transverse ledge portion 818 can be non-parallel to each other.

The outer spacers 820 can include an outer wall portion 822, a central transverse ledge portion 824, an upper transverse ledge portion 826, and a lower transverse ledge portion 828. Again, the terms "upper" and "lower" are used merely for convenience in this respect relative to the orientation of the inner spacers 810 shown in FIG. 8. A first groove 821 can be defined by the outer wall portion 822, the central transverse ledge portion 824, and the upper transverse ledge portion 826. A second groove 823 can be defined by the outer wall portion 822, the central transverse ledge portion 824, and the lower transverse ledge portion 828.

The central transverse ledge portion 824 can extend outwardly from the outer wall portion 822. The central transverse ledge portion 824 can be substantially perpendicular to the outer wall portion 822. In some arrangements, the upper transverse ledge portion 826 and the lower transverse ledge portion 828 can be non-parallel to the central transverse ledge portion 824. In some arrangements, the upper transverse ledge portion 826 and the lower transverse ledge portion 828 can be non-parallel to each other.

The inner spacers 810 and the outer spacers 820 can be configured as locking spacers. The outer diameter body portion 620 of the conical springs 600 can be received in one of the first groove 821 and the second groove 823 of the outer spacer 820. Thus, the outer diameter body portion 620 of the conical springs 600 can be lockingly engaged by and/or retainably received in the respective one of the first groove 821 and the second groove 823 of the outer spacer 820. Similarly, the inner diameter body portion 630 of the conical springs 600 can be received in one of the first groove 811 and the second groove 813 of the inner spacer 810. Thus, the inner diameter body portion 630 of the conical springs 600 can be lockingly engaged by and/or retainably received in the respective one of the first groove 811 and the second groove 813 of the inner spacer 810.

The vibration isolator 800 can include a first endcap 840 and a second endcap 850. The first endcap 840 can be operatively connected to and/or operatively positioned with respect to the first outermost conical spring 601 at a first end 870 of the stack 860. In some arrangements, one or more intermediate structures 803 can be located between the first endcap 840 and the first outermost conical spring 601. In other arrangements, the first endcap 840 and the first outermost conical spring 601 can directly contact each other. The second endcap 850 can be operatively connected to and/or operatively positioned with respect to the second outermost conical spring 602 at a second end 880 of the stack 860. In some arrangements, one or more intermediate structures 804 can be located between the second endcap 850 and the second outermost conical spring 602. In other arrangements, the second endcap 850 and the second outermost conical spring 602 can directly contact each other.

In some arrangements, the first endcap 840 and the second endcap 850 can be substantially identical to each other. In other arrangements, the first endcap 840 and the second endcap 850 can be different from each other in one or more respects. The first endcap 840 and the second endcap 850 can be made of any suitable material.

FIG. 7 shows an example in which the inner spacers 710 and the outer spacers 720 are non-locking spacers, and FIG. 8 shows an example in which the inner spacers 810 and the outer spacers 820 are locking spacers. However, it will be understood that arrangements described herein are not limited in this regard. Indeed, the vibration isolators can use any combination of locking and non-locking spacers for the inner spacers and/or the outer spacer. For example, the inner spacers can be locking spacers, and the outer spacers can be non-locking spacers, or vice versa. As another example, the inner spacers can be all locking spacers, all non-locking spacers, or any combination of locking spacers and non-locking spacers. Similarly, the outer spacers can be all locking spacers, all non-locking spacers, or any combination of locking spacers and non-locking spacers.

Referring to FIG. 9, a cross-sectional view of an example of a second vibration isolator located within a first vibration isolator is shown. As illustrated, both the first vibration isolator and the second vibration isolator are the vibration isolator 700 of FIG. 7. However, it will be understood that the first vibration isolator and the second vibration isolator can be any suitable type of vibration isolator. For example, the first vibration isolator and/or the second vibration isolator can be the vibration isolator 700 of FIG. 7 or the vibration isolator 800 of FIG. 8.

Further, it will be appreciated that the vibration isolator configurations described above are not the only vibration isolator configurations that can be used. Indeed, additional examples of the isolators can include any of those disclosed in U.S. Pat. Nos. 10,371,229 and 10,677,310 as well as U.S. Patent Publ. No. 2019/0186589, which are incorporated herein by reference in their entireties.

Figures 10B, 10C:
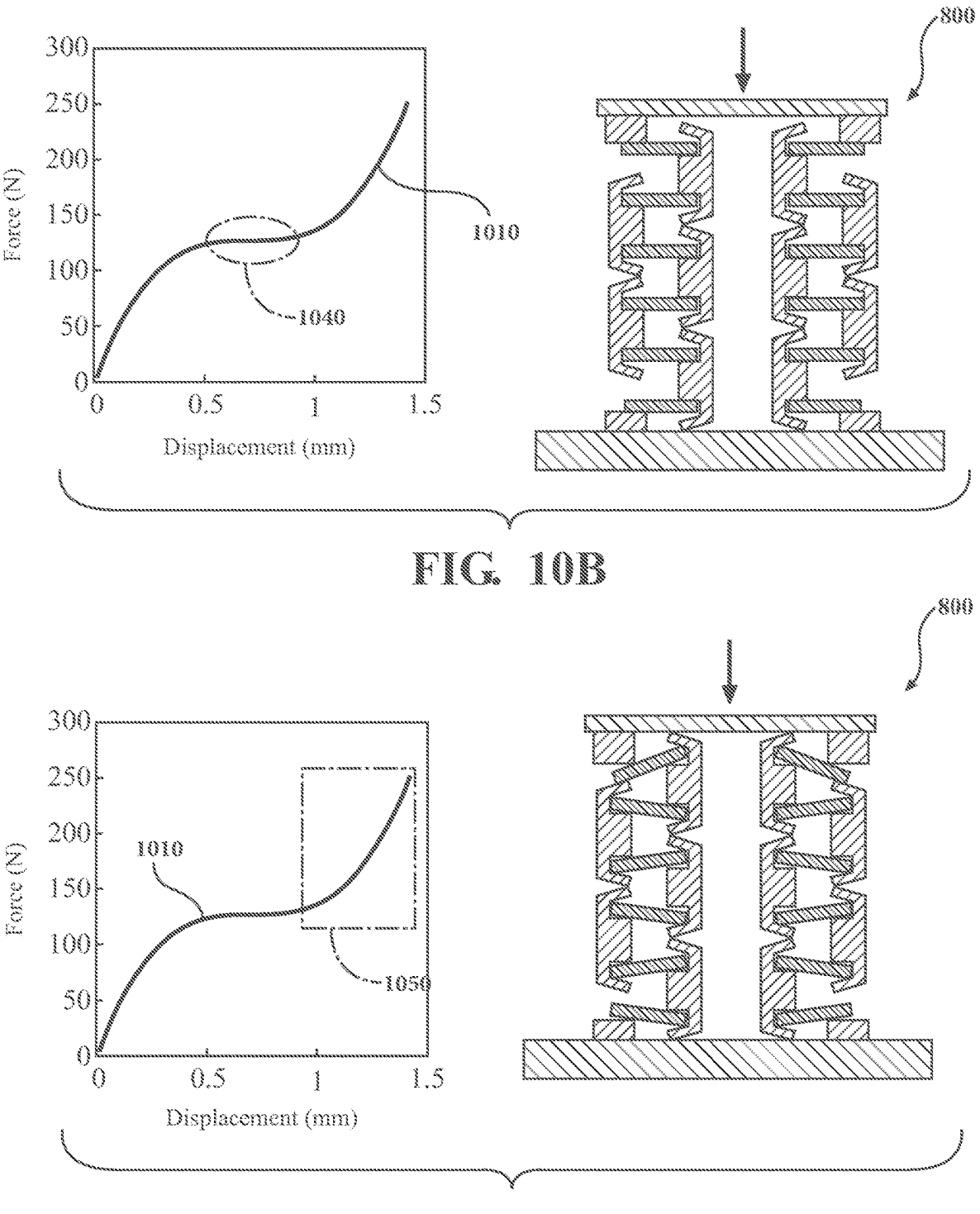

FIG. 10A-10C show the configuration of the vibration isolator 800 of FIG. 8 in various regions of the force-deflection curve. FIG. 10A shows a representation of the vibration isolator 800 in the initial stiffness region 1030 of the force-deflection curve 1010. As can be seen, the conical springs 600 can be substantially in their neutral condition. In the initial stiffness region 1030, the stiffness curve is substantially linear, increasing from the origin of the graph. The vibration isolator 800 can be relatively stiff in the initial stiffness region 1030.

In FIG. 10B, the vibration isolator 800 is in the quasi-zero stiffness region 1040 of the force-deflection curve 1010. In the quasi-zero stiffness region 1040, the force-deflection curve becomes substantially flat. The stiffness becomes very low—zero or substantially zero. The quasi-zero stiffness region 1040 allows for good isolation. In the quasi-zero stiffness region 1040, the conical springs 600 can become substantially flat.

In FIG. 10C, the vibration isolator 800 can be in the subsequent stiffness region 1050. In the subsequent stiffness region 1050, the stiffness curve can be substantially linear, increasing from the end of the quasi-zero stiffness region 1040. The vibration isolator 800 can be relatively stiff in the initial stiffness region 1030. As can be seen, the conical springs 600 can become inverted relative to their initial shape. It will be appreciated that the configuration of the vibration isolator 800 allows such inversion to occur.

It will be appreciated that the characteristics of the quasi-zero stiffness region can be tuned to attain the desired performance characteristics. Such tuning can be achieved by changing the characteristics of the conical springs, the quantity of the conical springs, the arrangement of the conical springs, other components of the isolators, and/or other factors, just to name a few possibilities.

It will be appreciated that arrangements described herein can provide numerous benefits, including one or more of the benefits mentioned herein. For instance, the arrangements described herein have the benefit of isolating a rider of a bicycle from vibrations transferred to the rider. The arrangements described herein can isolate the rider from vibrations transferred through the saddle of the bicycle to the rider. The arrangements described herein can improve the comfort of the ride as well as mitigate fatigue of the rider when using the bicycle.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A bicycle seat suspension, comprising:
a first three-bar linkage configured to be operatively connected to a bicycle saddle and configured to change configuration when a load is applied to the bicycle saddle;
a second three-bar linkage that is separate from the first three-bar linkage; and
a vibration isolator configured to exhibit a non-linear stiffness profile including a region of quasi-zero stiffness and being operatively positioned with respect to the first three-bar linkage such that, when the first three-bar linkage changes configuration responsive to a load being applied to the bicycle saddle, the first three-bar linkage engages the vibration isolator, whereby the vibration isolator isolates a person seated on the bicycle saddle from vibrations transferred through the bicycle saddle.

2. The bicycle seat suspension of claim 1, further comprising a second vibration isolator, wherein the second vibration isolator is operatively positioned with respect to the second three-bar linkage.

3. The bicycle seat suspension of claim 1, wherein the vibration isolator is a first vibration isolator and further comprising a second vibration isolator, wherein the second vibration isolator is located within the first vibration isolator.

4. The bicycle seat suspension of claim 1, wherein, when the first three-bar linkage engages the vibration isolator, the first three-bar linkage compresses the vibration isolator along a longitudinal axis of the vibration isolator.

5. The bicycle seat suspension of claim 1, wherein the vibration isolator includes a stack of a plurality of conical springs.

6. The bicycle seat suspension of claim 5, wherein the stack of the plurality of conical springs is arranged in an alternating pattern, wherein each of the plurality of conical springs includes an outer diameter body portion and an inner diameter body portion, and wherein, for each of the plurality of conical springs, at least one of:
the outer diameter body portion faces the outer diameter body portion of a neighboring one of the plurality of conical springs; and
the inner diameter body portion faces the inner diameter body portion of a neighboring one of the plurality of conical springs.

7. The bicycle seat suspension of claim 6, wherein the vibration isolator includes a plurality of inner spacers, wherein the plurality of inner spacers separates the inner diameter body portion of a neighboring pair of the conical springs, and wherein the plurality of inner spacers engages the inner diameter body portion of the neighboring pair of the conical springs.

8. The bicycle seat suspension of claim 6, wherein the vibration isolator includes a plurality of outer spacers, wherein the outer spacers separate the outer diameter body portion of a neighboring pair of the conical springs, and wherein the plurality of outer spacers engages the outer diameter body portion of the neighboring pair of the conical springs.

9. The bicycle seat suspension of claim 6, wherein the vibration isolator includes a first endcap and a second endcap, wherein the first endcap is operatively connected to a first outermost conical spring at a first end of the stack of the plurality of conical springs, and wherein the second endcap is operatively connected to a second outermost conical spring at a second end of the stack of the plurality of conical springs.

10. A bicycle seat, comprising:
a bicycle saddle;
a first three-bar linkage configured to be operatively connected to the bicycle saddle and configured to change configuration when a load is applied to the bicycle saddle;
a second three-bar linkage that is separate from the first three-bar linkage; and
vibration isolators including a first vibration isolator and a second vibration isolator each including a plurality of conical springs, being configured to exhibit a non-linear stiffness profile including a region of quasi-zero stiffness, and being operatively positioned with respect to the first three-bar linkage and the second three-bar linkage, respectively, such that, when the first three-bar linkage changes configuration responsive to a load being applied to the bicycle saddle, the first three-bar linkage engages the first vibration isolator, whereby the first vibration isolator isolates a person seated on the bicycle saddle from vibrations transferred through the bicycle saddle.

11. The bicycle seat of claim 10, further comprising:
a third vibration isolator, wherein the third vibration isolator is located within the first vibration isolator.

12. The bicycle seat of claim 10, wherein, when the first three-bar linkage engages the vibration isolator, the first three-bar linkage compresses the first vibration isolator along a longitudinal axis of the first vibration isolator.

13. The bicycle seat of claim 10, wherein the first vibration isolator includes a stack of a plurality of conical springs.

14. The bicycle seat of claim 13, wherein the stack of the plurality of conical springs is arranged in an alternating pattern, wherein each of the plurality of conical springs includes an outer diameter body portion and an inner diameter body portion, and wherein, for each of the plurality of conical springs, at least one of:
the outer diameter body portion faces the outer diameter body portion of a neighboring one of the plurality of conical springs; and
the inner diameter body portion faces the inner diameter body portion of a neighboring one of the plurality of conical springs.

15. The bicycle seat of claim 14, wherein the first vibration isolator includes a plurality of inner spacers, wherein the plurality of inner spacers separates the inner diameter body portion of a neighboring pair of the conical springs, and wherein the plurality of inner spacers engage the inner diameter body portion of the neighboring pair of the conical springs.

16. A bicycle seat suspension, comprising:
three-bar linkages including a first three-bar linkage and a second three-bar linkage that is separate from the first three-bar linkage, the three-bar linkages being aligned along a longitudinal direction of a bicycle saddle, configured to be operatively connected to the bicycle saddle, and configured to change configuration when a load is applied to the bicycle saddle; and
vibration isolators operatively positioned with respect to the first three-bar linkage and the second three-bar linkage and configured to exhibit a non-linear stiffness profile including a region of quasi-zero stiffness, the vibration isolators being operatively positioned with respect to the three-bar linkages such that, when the three-bar linkages change configuration responsive to a load being applied to the bicycle saddle, the three-bar linkages engage the vibration isolators, whereby the vibration isolators isolate a person seated on the bicycle saddle from vibrations transferred through the bicycle saddle.

* * * * *